(12) United States Patent
Maheshwari et al.

(10) Patent No.: US 10,129,222 B2
(45) Date of Patent: *Nov. 13, 2018

(54) TRUSTED STORAGE SYSTEMS AND METHODS

(71) Applicant: Intertrust Technologies Corporation, Sunnyvale, CA (US)

(72) Inventors: Umesh Maheshwari, San Jose, CA (US); Radek Vingralek, Belmont, CA (US); W. Olin Sibert, Lexington, MA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,320

(22) Filed: Apr. 24, 2017

(65) Prior Publication Data

US 2018/0013731 A1    Jan. 11, 2018

Related U.S. Application Data

(63) Continuation of application No. 14/988,477, filed on Jan. 5, 2016, now Pat. No. 9,641,490, which is a
(Continued)

(51) Int. Cl.
*H04L 29/06* (2006.01)
*H04L 9/06* (2006.01)
(Continued)

(52) U.S. Cl.
CPC ...... *H04L 63/0428* (2013.01); *G06F 21/6218* (2013.01); *G06F 21/80* (2013.01);
(Continued)

(58) Field of Classification Search
CPC . H04L 9/08; H04L 9/06; H04L 9/0643; H04L 9/3223; H04L 9/3236; G06F 21/72;
(Continued)

(56) References Cited

U.S. PATENT DOCUMENTS

| 4,309,569 A | 1/1982 | Merkle |
| 4,319,079 A | 3/1982 | Best |

(Continued)

FOREIGN PATENT DOCUMENTS

| AU | A-36815/1997 | 4/1997 |
| AU | A-36840/1997 | 4/1997 |

(Continued)

OTHER PUBLICATIONS

Ammann, Paul, et al., "Surviving Information Warfare Attacks on Databases," Proc. 1997, IEEE Symp. on Security and Privacy, May 4-7, 1997, pp. 164-174.

(Continued)

*Primary Examiner* — Hosuk Song
(74) *Attorney, Agent, or Firm* — Finnegan, Henderson, Farabow, Garrett & Dunner, LLP

(57) ABSTRACT

Systems and methods are disclosed for providing a trusted database system that leverages a small amount of trusted storage to secure a larger amount of untrusted storage. Data are encrypted and validated to prevent unauthorized modification or access. Encryption and hashing are integrated with a low-level data model in which data and meta-data are secured uniformly. Synergies between data validation and log-structured storage are exploited.

20 Claims, 13 Drawing Sheets

Related U.S. Application Data continuation of application No. 14/532,401, filed on Nov. 4, 2014, now Pat. No. 9,251,365, which is a continuation of application No. 13/914,556, filed on Jun. 10, 2013, now Pat. No. 8,904,188, which is a continuation of application No. 13/531,322, filed on Jun. 22, 2012, now Pat. No. 8,464,071, which is a continuation of application No. 12/785,343, filed on May 21, 2010, now Pat. No. 8,209,544, which is a continuation of application No. 11/340,326, filed on Jan. 25, 2006, now Pat. No. 7,752,455, which is a continuation of application No. 09/617,148, filed on Jul. 17, 2000, now Pat. No. 7,152,165.

(60) Provisional application No. 60/144,378, filed on Jul. 16, 1999.

(51) Int. Cl.
  *G06F 21/62* (2013.01)
  *G06F 21/80* (2013.01)

(52) U.S. Cl.
  CPC .......... *G06F 21/805* (2013.01); *H04L 9/0643* (2013.01); *G06F 2211/007* (2013.01)

(58) Field of Classification Search
  CPC ........ G06F 21/78; G06F 21/86; G06F 21/805; G06F 21/80; G06F 2211/007
  USPC ............ 380/277, 37, 44; 713/181, 189, 190, 713/192–194
  See application file for complete search history.

(56) References Cited

U.S. PATENT DOCUMENTS

| | | | |
|---|---|---|---|
| 4,803,725 A | 2/1989 | Horne et al. | |
| 4,827,508 A | 5/1989 | Shear | |
| 4,977,594 A | 12/1990 | Shear | |
| 5,010,571 A | 4/1991 | Katznelson | |
| 5,050,213 A | 9/1991 | Shear | |
| 5,136,648 A | 8/1992 | Olson et al. | |
| 5,247,575 A | 9/1993 | Sprague et al. | |
| 5,319,705 A | 6/1994 | Halter et al. | |
| 5,394,469 A | 2/1995 | Nagel et al. | |
| 5,410,598 A | 4/1995 | Shear | |
| 5,646,997 A | 7/1997 | Barton | |
| 5,713,018 A | 1/1998 | Chan | |
| 5,794,252 A | 8/1998 | Bailey et al. | |
| 5,826,268 A | 10/1998 | Schaefer et al. | |
| 5,862,357 A | 1/1999 | Hagersten et al. | |
| 5,892,900 A | 4/1999 | Ginter et al. | |
| 5,910,987 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,999,949 A | 12/1999 | Crandall | |
| 6,016,490 A | 1/2000 | Watanabe et al. | |
| 6,044,370 A | 3/2000 | Anfindsen | |
| 6,112,181 A | 8/2000 | Shear et al. | |
| 6,157,721 A | 12/2000 | Shear et al. | |
| 6,185,683 B1 | 2/2001 | Ginter et al. | |
| 6,259,801 B1 | 7/2001 | Wakasu | |
| 6,278,791 B1 | 8/2001 | Honsinger et al. | |
| 6,708,273 B1 | 3/2004 | Ober et al. | |
| 6,816,596 B1 | 11/2004 | Peinado et al. | |
| 6,976,165 B1 | 12/2005 | Carpentier et al. | |
| 7,152,165 B1 | 12/2006 | Maheshwari et al. | |
| 7,152,455 B2 | 12/2006 | Bair et al. | |
| 7,178,041 B2 | 2/2007 | Asokan et al. | |
| 7,428,636 B1 | 9/2008 | Waldspurger et al. | |
| 7,499,542 B2 | 3/2009 | Vaudenay et al. | |
| 7,752,455 B2 | 7/2010 | Maheshwari et al. | |
| 7,757,101 B2 | 7/2010 | Nonaka et al. | |
| 7,890,754 B2* | 2/2011 | Waldspurger ......... | H04L 63/083 713/164 |
| 7,920,700 B2 | 4/2011 | Pandey et al. | |
| 7,949,128 B2 | 5/2011 | Bunimov et al. | |
| 8,001,385 B2 | 8/2011 | Rudelic | |
| 8,464,071 B2 | 6/2013 | Maheshwari et al. | |
| 8,555,081 B2 | 10/2013 | Chen et al. | |
| 8,559,631 B1 | 10/2013 | Waters | |
| 8,566,612 B2* | 10/2013 | Davis ...................... | G06F 21/72 370/218 |
| 8,661,263 B2 | 2/2014 | Mattsson | |
| 8,738,932 B2 | 5/2014 | Lee et al. | |
| 8,799,681 B1* | 8/2014 | Linnell ................... | G06F 21/62 380/277 |
| 8,978,155 B2* | 3/2015 | Erway ..................... | H04L 9/008 709/204 |
| 9,152,579 B2* | 10/2015 | Mattsson ............ | G06F 21/6209 |
| 9,251,365 B2 | 2/2016 | Maheshwari et al. | |
| 9,558,374 B2* | 1/2017 | Shah ..................... | H04L 9/0822 |
| 9,641,490 B2* | 5/2017 | Maheshwari ....... | G06F 21/6218 |
| 2001/0042043 A1 | 11/2001 | Shear et al. | |

FOREIGN PATENT DOCUMENTS

| | | |
|---|---|---|
| EP | 0 715 246 A1 | 6/1996 |
| WO | WO 1996/027155 A2 | 9/1996 |
| WO | WO 1996/027155 A3 | 9/1996 |
| WO | WO 1997/043761 A2 | 11/1997 |
| WO | WO 1997/043761 A3 | 11/1997 |
| WO | WO 1998/009209 A1 | 3/1998 |
| WO | WO 1998/010381 A1 | 3/1998 |
| WO | WO 1999/001815 | 1/1999 |
| WO | WO 1999/014652 | 3/1999 |
| WO | WO 1999/048296 | 9/1999 |
| WO | WO 2001/006374 A3 | 1/2001 |

OTHER PUBLICATIONS

Anderson, Ross, et al., "Tamper Resistance—a Cautionary Note", The Second USENIX Workshop on Electronic Commerce Proceedings, Oakland, California, Nov. 18-21, 1996, pp. 1-11.

Atkinson, M.P., et al., "The Computer Journal", The Computer Society, vol. 26, No. 4, Nov. 1983, 6 pages.

Aucsmith, David, "Tamper Resistant Software: An Implementation," First International Workshop, Cambridge, United Kingdom, May 30-Jun. 1, 1996, pp. 317-333.

Bellare, Mihir, et al., "Forward Integrity for Secure Audit Logs," Dept. of Computer Science and Engineering, University of California San Diego, Nov. 23, 1997, 16 pages.

Blackwell, Trevor, et al., Heuristic Cleaning Algorithms in Log-Structured File Systems Proc. of the 1995 USENIX Technical Conference, Jan. 16-20, 1995, pp. 277-288.

Blaze, Matt, "A Cryptographic File System for Unix, First ACM Conference on Communications and Computing Security," Nov. 3-5, 1993, 8 pages.

Blum, Manuel, et al., "Checking the Correctness of Memories," Proc. IEEE Conf. on Foundations of Computer Science, 1991, pp. 90-99.

Carey, Michael J., et al., "The Exodus Extensible DBMS Project: An Overview", Computer Sciences Department, University of Wisconsin, Madison, Wisconsin, 1988, pp. 1-26.

Castro, Miguel, et al., "Practical Byzantine Fault Tolerance," Third Symposium on Operating Systems Design and Implementation, 1999, pp. 173-186.

Chan, Arvola, et al., "The Implementation of an Integrated Concurrency Control and Recovery Scheme," International Conference on Management of Data, ACM SIGMOND, Jun. 2-4, 1982, pp. 184-191.

Cohen, Frederick B., "Operating System Protection Through Program Evolution," Computers & Security, 12(6), Elsevier Science Publishers, Ltd., 1993, pp. 565-584.

Collberg, Christian, "Manufacturing Cheap, Resilient, and Stealthy Opaque Constructs", ACM Press, ACM SIGPLAN-SIGACT, 1998 pp. 184-196.

(56) References Cited

OTHER PUBLICATIONS

"Cryptographic Security and Key Management Systems—the nFast/KM Solution", nCipher Corp. Limited, Jan. 1998, http!//www.ncipher.com/products/rscs/downloads/whitepapers/key.pdf.
de Jonge, Wiebren, et al., "The Logical Disk: A New Approach to Improving File Systems", Dept. of Mathematics and Computer Science, Vrije Universiteit, Amsterdam, 1994, 14 pages.
Fu, Kevin, et al., "Fast and Secure Distributed Read-Only File System," Proc. Symposium on Operating System Design and Implementation, 13(16), Aug. 30, 2000, pp. 1-16.
Garay, Juan A., et al., "Secure Distributed Storage and Retrieval," 11th Inti. Workshop on Distributed Algorithms, 1997, pp. 275-289.
Gray, J., "The Benchmark Handbook for Database and Transaction Proceeding Systems," Morgan Kaufmann, 1991.
Gray, J., et al., "Transaction Processing: Concepts and Techniques," Morgan Kaufmann, 1993.
Gray, Jim, et al., "The Recovery Management of the System R Database Manager," ACM Computing Surveys, vol. 13, No. 2, Jun. 1981, pp. 223-242.
Hoare, C.A.R., et al., "An Operating System Structuring Concept," Communications of the ACM, 1974, pp. 549-557.
Hutchinson, Norman C., et al., "Logical vs. Physical File System Backup," Proc. of the 3'd Symp. on Operating System Design and Implementation, Feb. 1999, 12 pages.
Hwang, Deborah Jing-Hwa, "Function-Based Indexing for Object Oriented Databases", Ph.D. Thesis, MIT, Feb. 1994 172 pages.
Kemper, A, et al., "Function Materialization in Object Bases," In Proceedings of the ACM SIGMOND International Conference on Management of Data, May 29-31, 1991, pp. 258-267.
Kommerling, Oliver, et al., "Design Principles for Tamper-Resistant Smartcard Processors," Proc. of the USENIX Workshop on Smartcard Technology, May 10-11, 1999, pp. 9-20.
Krawczyk, Hugo, "Distributed Fingerprints and Secure Information Dispersal," Proc. of the Twelfth Annual ACM Symp. on Principles of Distributed Computing, Aug. 15-18, 1993, pp. 207-218.
Lamb, Charles, et ai.,"The Objectstore Database System," Communications of the ACM, vol. 34, No. 10, Oct. 1991, pp. 50-63.
Larson, Per-Ake, "Dynamic Hash Tables, Communications of the ACM," vol. 31, No. 4, Apr. 1988, pp. 446-457.
Liskov, B., et al., "Safe and Efficient Sharing of Persistent Objects in Thor," ACM SIGMOND, vol. 25, Issue 2, Jun. 1996, pp. 318-329.
Lome!, David B, "The Case for Log Structuring in Database Systems," Proceedings of the 6th Int'l Workshop on High Performance Transaction Systems, 1995, pp. 1-5.
Maier, David, et al., "Indexing in an Object-Oriented DBMS", International Workshop on Object-Oriented Database Systems, IEEE Computer Society Press, Sep. 23-26, 1986, pp. 171-182.
Mazieres, David, et al., "Separating Key Management from File System Security", 17th ACM Symposium on Operating Systems Principles, vol. 34, No. 5, Dec. 1999, pp. 124-139.
Melton, J., et al., "The New SQL: A Complete Guide." Morgan Kaufmann, 1993.
Menzes, Alfred J., et al., "Handbook of Applied Cryptography," CRC Press, 1995.
Merkle, Ralph C., "Protocols for Public Key Cryptosystems", Proceedings of the 1980 Symposium on Security and Privacy, Oakland, California, Apr. 14-16, 1980, IEEE Catalog No. 80 CH1522-2, Library of Congress, 1980, pp. 122-134.
Mohan, C., et al., "Aries/IM: An Efficient and High Concurrency Index Management Method Using Write—Ahead Logging," The Association for Computing Machinery, 1992, pp. 371-380.
Moss, J. Eliot B., "Working with Persistent Objects: To Swizzle or Not to Swizzle", Computer and Information Science, University of Massachusetts, Amherst, Massachusetts, Jul. 19, 1991, pp. 1-39.
"Product Standard Data Management: ISAM", the Open Group, Jan. 1998, 4 pages.
Provos, Niels, "Encrypting Virtual Memory," Proc. of the 9th USENIX Security Symposium, Aug. 14-17, 2000, 10 pages.

Rabin, Michael O., Efficient Dispersal of Information for Security, Load Balancing, and Fault Tolerance, Journal of the ACM, vol. 36, No. 2, Apr. 1989, pp. 335-348.
Rosenblum, Mendel, et al., "The Design and Implementation of a Log-Structured File System," Proc. of the 13th ACM Symposium on Operating Systems Principles, 1991, pp. 1-15.
Rosenblum, Mendel, et al. "The Design and Implementation of a Log-Structured File System," ACM Transactions on Computer Systems, vol. 10, No. 1, Feb. 1992, pp. 26-52.
Schneier, Bruce, "Applied Cryptography," Second Edition, John Wiley & Sons, 1996, pp. 233-482.
Schneier, Bruce, et al., "Cryptographic Support for Secure Logs on Untrusted Machines," Proc. of the $7^{th}$ USENIX Security Symposium, Jan. 26-29, 1998, 11 pages.
Sean W., et al., "Using a High-Performance, Programmable Secure Coprocessor," Proceedings of the Second International Conference on Financial Cryptography, 1998, pp. 1-17.
Seltzer, Margo, et al., "An Implementation of a Log-Structured File System for Unix," Proceedings of the 1993 Winter USENIX Conference, Jan. 25-29, 1993, pp. 307-326.
Seltzer, Margo I., et al., "Challenges in Embedded Database System Administration", USENIX Proceedings of the Embedded Systems Workshop, Mar. 29-31, 1999, pp. 1-7.
Sibert, Olin, et al., "DigiBox: A Self-Protecting Container for Information Commerce," Proceedings of the first USENIX Workshop on Electronic Commerce, New York, NY, Jul. 1995, 13 pages.
Smith, Sean W., et al., "Using a High-Performance, Programmable Secure Coprocessor," Second Inti. Conf. on Financial Cryptography, Feb. 23-25, 1998, pp. 73-89.
Stonebraker, Michael, "The Design of the Postgres Storage System", Navy Electronics Systems Commander, EECS Department, University of California, Berkeley, California, Sep. 1987, pp. 1-18.
Ylonen, Tatu "Shadow Paging is Feasible," Licentiate's Thesis, Helsinki University of Technology, Apr. 27, 1994, pp. 1-149.
Office Action dated Feb. 3, 2004, for U.S. Appl. No. 09/617,148, filed Jul. 17, 2000.
Office Action dated Jun. 4, 2004, for U.S. Appl. No. 09/617,148, filed Jul. 17, 2000.
Office Action dated Mar. 1, 2005, for U.S. Appl. No. 09/617,148, filed Jul. 17, 2000.
Notice of Allowance dated Oct. 14, 2005, for U.S. Appl. No. 09/617,148, filed Jul. 17, 2000.
International Search Report dated Apr. 26, 2001, for PCT Application No. PCT/US00/19421, filed Jul. 17, 2000.
Written Opinion dated Aug. 17, 2001, for PCT Application No. PCT/US00/19421, filed Jul. 17, 2000.
International Preliminary Examination Report dated Oct. 16, 2001, for PCT Application No. PCT/US00/19421, filed Jul. 17, 2000.
Office Action dated Jun. 10, 2009, for U.S. Appl. No. 11/338,187, filed Jan. 23, 2006.
Notice of Allowance dated Oct. 30, 2009, for U.S. Appl. No. 11/338,187, filed Jan. 23, 2006.
Office Action dated Jun. 1, 2009, for U.S. Appl. No. 11/340,326, filed Jan. 25, 2006.
Notice of Allowance dated Feb. 22, 2010, for U.S. Appl. No. 11/340,326, filed Jan. 25, 2006.
Office Action dated Jun. 21, 2011 for U.S. Appl. No. 12/785,343, filed May 21, 2010.
Office Action dated Nov. 28, 2011 for U.S. Appl. No. 12/785,343, filed May 21, 2010.
Notice of Allowance dated Mar. 23, 2012 for U.S. Appl. No. 12/785,343, filed May 21, 2010.
Office Action dated Feb. 13, 2013 for U.S. Appl. No. 13/531,322, filed Jun. 22, 2012.
Notice of Allowance dated Mar. 25, 2013 for U.S. Appl. No. 13/531,322, filed Jun. 22, 2012.
Office Action dated Apr. 7, 2014 for U.S. Appl. No. 13/914,556, filed Jun. 10, 2013.
Notice of Allowance dated Aug. 1, 2014 for U.S. Appl. No. 13/914,556, filed Jun. 10, 2013.
Office Action dated May 19, 2015 for U.S. Appl. No. 14/532,401, filed Nov. 4, 2014.

(56) References Cited

OTHER PUBLICATIONS

Notice of Allowance dated Sep. 17, 2015 for U.S. Appl. No. 14/532,401, filed Nov. 4, 2014.
Office Action dated Jul. 14, 2016 for U.S. Appl. No. 14/988,477, filed Jan. 5, 2016.
Notice of Allowance dated Dec. 30, 2016 for U.S. Appl. No. 14/988,477, filed Jan. 5, 2016.

* cited by examiner

─ 613

| Descriptor Table -- 702 | |
|---|---|
| Chunk Location -- 710 | Chunk Hash -- 712 |
| 704a → Loc$_1$ | Hash$_1$ |
| 704b → ... | ... |
| Loc$_n$ | Hash$_n$ |

| |
|---|
| 722 → -- Descriptor of Subtree Root (Location, Hash) |
| 724 → -- Encryption Used for Subtree (Algorithm, Key) |
| 726 → -- Hashing Algorithm Used for Subtree |
| 730 → -- Allocation Information (partition changes, free list head) |
| 732 → -- Subtree Copy Information |
| ... |

TRUSTED STORAGE SYSTEMS AND METHODS

RELATED APPLICATIONS

This application is a continuation of U.S. application Ser. No. 14/988,477, filed Jan. 5, 2016, which issued as U.S. Pat. No. 9,641,490, which is a continuation of U.S. application Ser. No. 14/532,401, filed Nov. 4, 2014, which issued as U.S. Pat. No. 9,251,365, which is a continuation of U.S. application Ser. No. 13/914,556, filed Jun. 10, 2013, which issued as U.S. Pat. No. 8,904,188, which is a continuation of U.S. application Ser. No. 13/531,322, filed Jun. 22, 2012, which issued as U.S. Pat. No. 8,464,071, which is a continuation of U.S. application Ser. No. 12/785,343, filed May 21, 2010, which issued as U.S. Pat. No. 8,209,544, which is a continuation of U.S. application Ser. No. 11/340,326, filed Jan. 25, 2006, which issued as U.S. Pat. No. 7,752,455, which is a continuation of U.S. application Ser. No. 09/617,148, filed Jul. 17, 2000, which issued as U.S. Pat. No. 7,152,165, which claims the benefit of U.S. Provisional Patent Application Ser. No. 60/144,378, entitled "A Trusted Database for an Untrusted Storage System," filed Jul. 16, 1999, all of which are hereby incorporated by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates generally to the storage of electronic data. More specifically, the present invention relates to systems and methods for securing electronic data for storage in potentially untrusted environments.

BACKGROUND OF THE INVENTION

In some distributed applications, computer programs are called upon to perform sensitive operations in untrusted environments. For example, vendors of digital goods like music and software may wish to control a consumer's use of those goods. One way to do this is to run a special rights-management program on the consumer's computer system or playing device that enforces the terms of the consumer's contract with the vendor. To increase performance and fault tolerance, and to facilitate a flexible range of business relationships between vendor and consumer, such a program may avoid communicating with other systems for relatively long periods of time. As a result, the program may need to store a variety of sensitive, transaction-related data—such as account balances, purchase receipts, usage records, budgets, billing records, and the like—on the consumer's system. Although the program may occasionally send this information to a trusted computer for processing, this type of communication may be limited for performance, fault tolerance, privacy, or other reasons.

In such a system, the consumer may have both the incentive and the opportunity to alter the vendor's rights management program in order to obtain unauthorized benefits. While it may not be possible to secure the rights management program completely, since the consumer will typically have ultimate control over the underlying hardware and the operating system, a number of software and hardware platforms are emerging that reduce the risk of attack. These platforms typically include a processing environment that allows authorized programs to run with reduced risk of reverse engineering and tampering. For example, this may be achieved with a hardware package containing a processor, memory, and some tamper-detecting circuitry, and/or by various techniques for software obfuscation and tamper detection. However, these platforms typically do not provide trusted, persistent storage in bulk, as it is generally difficult to prevent read and write access to devices such as disk drives and flash memory from outside the trusted platform. Thus, if sensitive records are stored locally, attackers might try to read, modify, add, or delete those records in order to undermine effective enforcement of the terms of their contract with the vendor. Systems and methods are thus needed for providing trusted bulk storage in potentially untrusted computing environments.

SUMMARY OF THE INVENTION

Systems and methods for implementing and using a trusted storage system in an untrusted environment are disclosed. Embodiments of the present invention facilitate the storage of sensitive data in digital rights management and other systems. It should be appreciated that the present invention can be implemented in numerous ways, including as a process, an apparatus, a system, a device, a method, or a computer readable medium. Several inventive embodiments of the present invention are described below.

In one embodiment, a trusted database system is provided that leverages a tested processing environment and a small amount of trusted storage to provide tamper-detection and secrecy to a bulk of untrusted storage. The trusted database integrates encryption and hashing with a low-level data model that secures data and meta-data uniformly. This model is powerful enough to support higher-level database functions such as transactions, backups, and indexing.

In one embodiment, the trusted database system uses log-structured storage. The implementation is simplified by embedding a hash tree in the comprehensive location map that forms as important part of log-structured systems, thus enabling objects to be validated as they are located. A checkpointing optimization defers and consolidates the propagation of hash values up the tree. Since updates are not made in place, a snapshot of the database state can be created using copy-on-write, which facilitates incremental backups. The absence of fixed object locations reduces the predictability of accesses, providing resistance to traffic monitoring.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 7A and 7B illustrate the format of chunks of data stored on untrusted storage in an embodiment of the present invention.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while certain embodiments are described in the context of a system and method for implementing a trusted database in an untrusted environment, those skilled in the art will recognize that the disclosed systems and methods are readily adaptable for broader application. For example, without limitation, the present invention could be readily applied in the context of a trusted environment or a substantially trusted environment. In addition, while numerous specific details are set forth in the following description in order to provide a thorough understanding of the present invention, the present invention may be practiced according to the claims without some or all of these details. Moreover, for the purpose of clarity, certain technical material that is known in the art related to the invention has not been described in detail in order to avoid unnecessarily obscuring the present invention.

Figure 1:
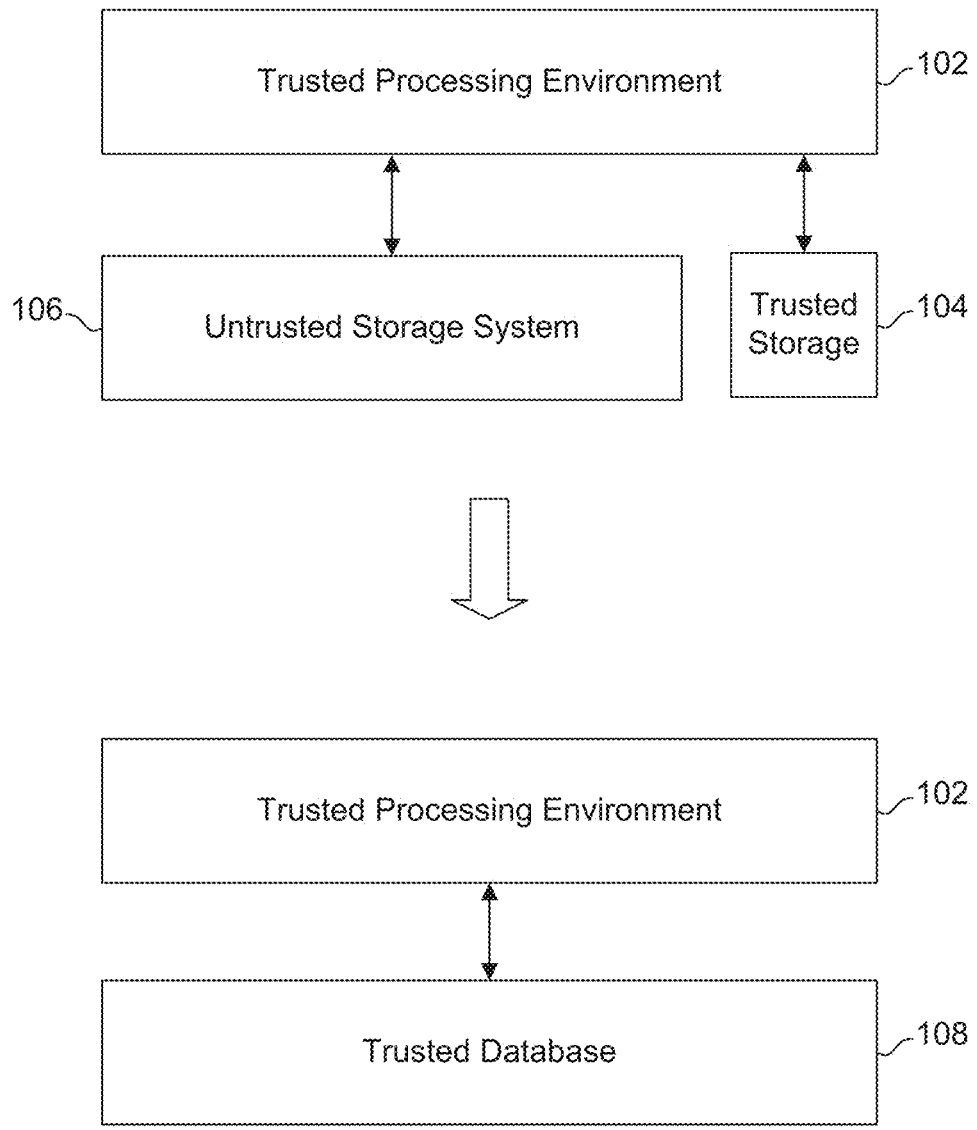
FIG. 1 is a block diagram illustrating the creation of trusted bulk storage in accordance with the principles of the present invention.

As shown in FIG. 1, the systems and methods of the present invention are operable to secure an untrusted storage medium 106 by leveraging a trusted processing environment 102 and a small amount of trusted storage 104 (where the term "trusted" is intended to refer generally to relative secrecy and/or resistance to tampering). That is, the systems and methods of the present invention are operable to effectively create trusted bulk storage 108 using system resources 102, 104, 106. While authorized programs are able to read data from, and write data to, trusted database 108, unauthorized programs are unable to read data from trusted database 108 or to alter the data stored therein without detection.

Figure 2:
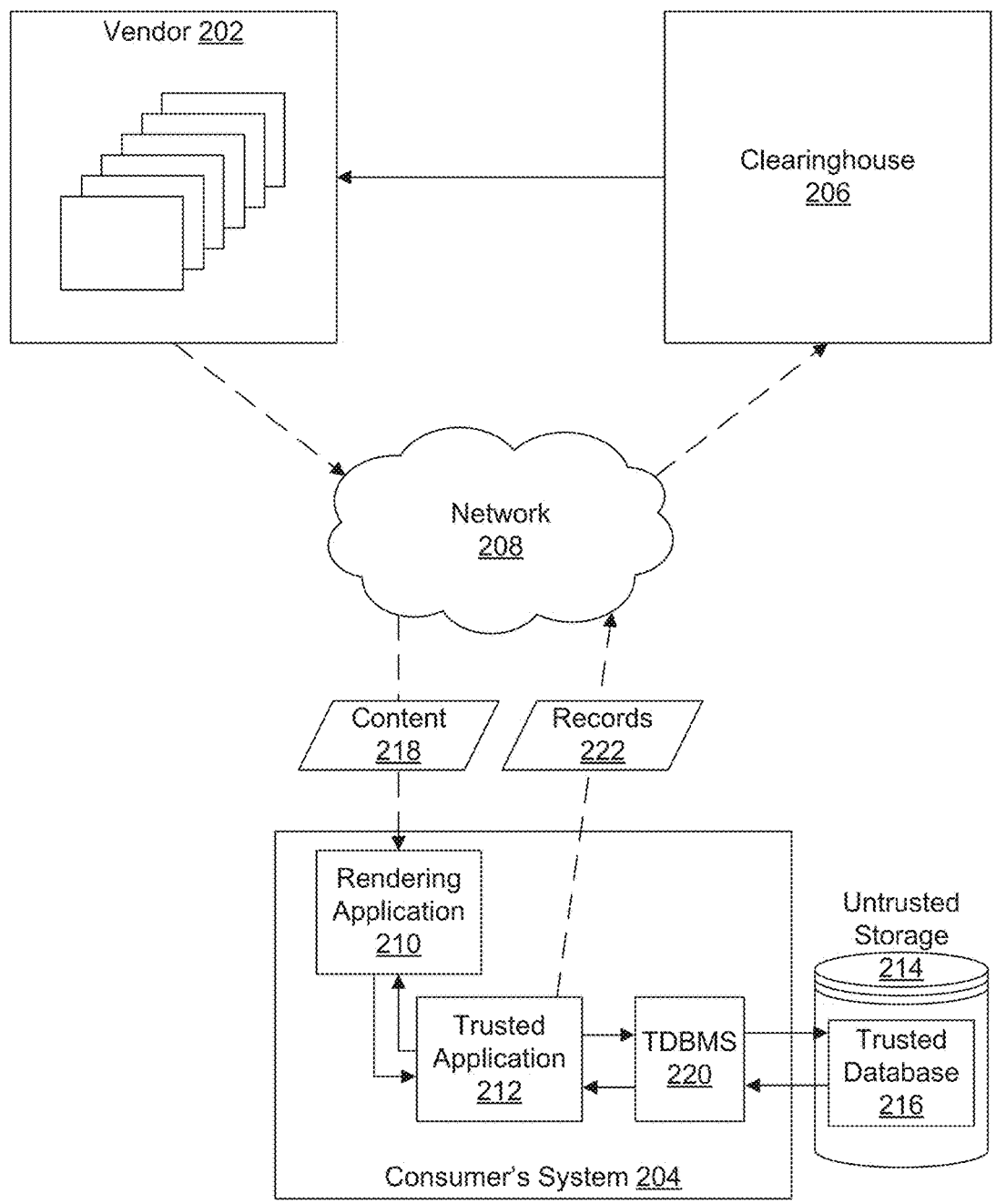
FIG. 2 illustrates the use of a trusted database in a distributed digital rights management system.

FIG. 2 shows how the trusted database of the present invention might be used in the context of a digital rights management system, and is provided as an example of how the systems and methods of the present invention can improve the security and efficiency of systems that rely on, or could benefit from, secure bulk storage. It should be appreciated, however, that the systems and methods of the present invention are readily adaptable for application outside the context of digital rights management systems.

In a digital rights management system, a vendor 202 might supply electronic content 218 to a consumer for use on the consumer's computer system 204. For example, a consumer might download an encrypted audio or video file from the vendor's Internet web site. Content 218 may be associated with certain rules that are intended to govern the consumer's use of the content. For example, the vendor of an audio track may wish to charge the consumer $0.10 each time the consumer listens to the track. To enforce such a rule, the vendor may supply the consumer with an application program 212 that is able to decrypt content 218, debit the user's account, and record other information about the transaction. When a consumer attempts to use downloaded content 218 by invoking a rendering program 210 such as an electronic jukebox, the vendor's trusted application 212 will process the consumer's request, charge the consumer's account, and decrypt and release content 218 to the rendering application 210. Trusted application 212 may also transmit records 222 relating to the transaction to a clearinghouse 206 for processing (e.g., billing the consumer's account and crediting the vendor's account) and storage. Additional information on digital rights management systems can be found in Ginter et al., "Systems and Methods for Secure Transaction Management and Electronic Rights Protection," U.S. Pat. No. 5,892,900, issued on Apr. 6, 1999 ("the '900 patent"), which is hereby incorporated by reference in its entirety.

In order to support offline operation and/or to otherwise increase efficiency, trusted application 212 might wish to store sensitive bookkeeping, usage, or other information locally. Since a typical consumer's system may not contain a sufficient amount of trusted, non-volatile storage to hold this information, it may be necessary to store this information on untrusted local storage, such as the consumer's hard disk drive 214. However, vendor 202 and/or clearinghouse operator 206 will want assurance that the data stored on local storage will not be tampered with, or, if tampering does occur, that it can be quickly detected and recovered from.

The present invention provides systems and methods for securing sensitive data in such a manner that it can be securely stored on untrusted storage. In particular, the present invention provides systems and methods for effectively converting untrusted bulk storage 214 to trusted storage 216. Thus, trusted application 212 is able to write sensitive data to, and read sensitive data from, untrusted bulk storage 214, and vendors, clearinghouses, consumers, and others can have confidence in the integrity and secrecy of such data. In one embodiment, a trusted database management system (TDBMS) 220 is responsible for performing the data manipulation and security transformations that enable the trusted storage of sensitive data on an untrusted storage medium.

Trusted database management system 220 is preferably implemented in software executable by the microprocessor of the consumer's system 204, and may make use of a variety of system resources, as described in more detail below. In one embodiment TDBMS 220 is a stand-alone executable program with an application programming interface that is callable by trusted applications. To gain access to the data maintained by TDBMS 200, applications 212 first validate themselves to TDBMS 220. For example, application 212 might validate itself by demonstrating knowledge of a secret cryptographic key. Such validation techniques are well-known, and it will be appreciated that any suitable validation technique could be used.

In another embodiment, TDBMS 220 is implemented as an embedded component library that is linked to the trusted application 212. For example, TDBMS 220 could be linked to trusted application 212 before it is distributed to the consumer. In such an embodiment, TDBMS 220 would form an integrated part of the trusted application program.

Figure 3A:
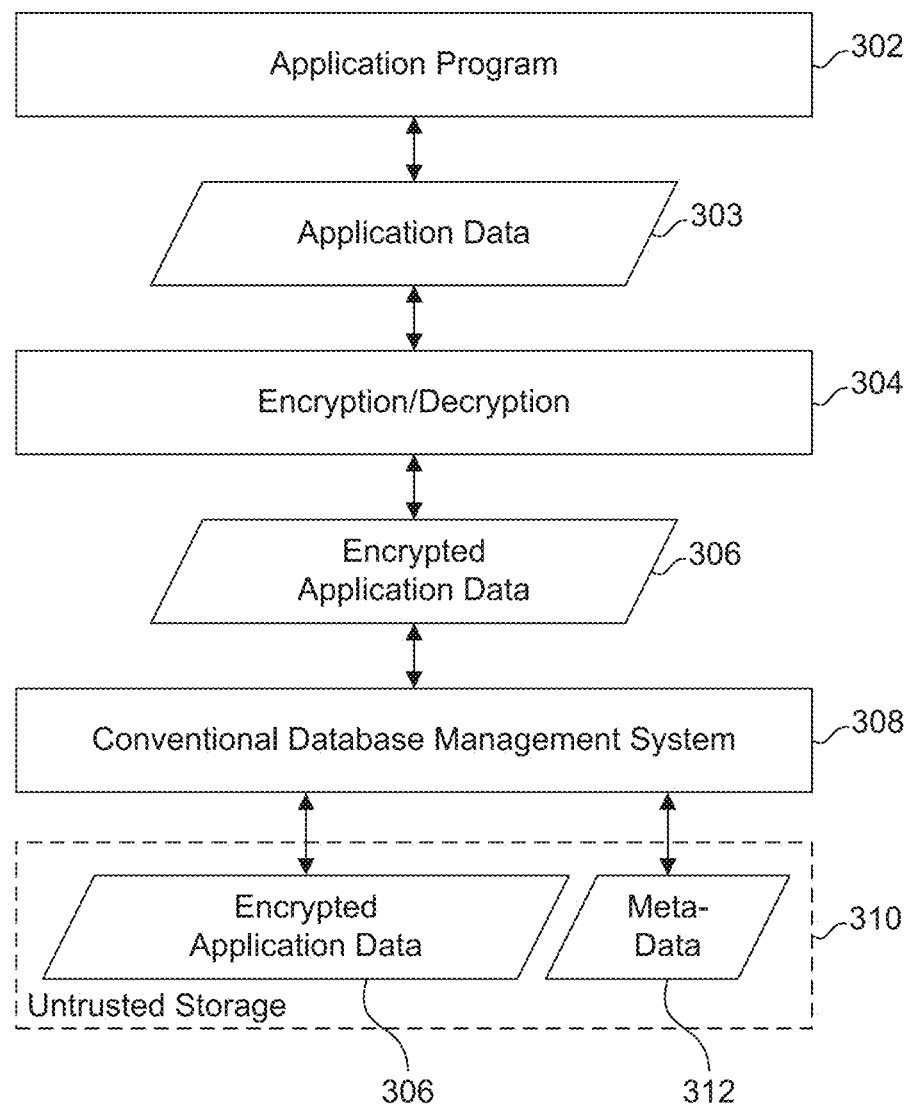
FIG. 3A shows an attempt to build a trusted database system by layering cryptography on lap of a conventional database system.

The implementation and operation of a trusted database management system will now be described in more detail with reference to FIGS. 3A-11. As shown in FIG. 3A, one might consider building a trusted database system by adding a security layer 304 on top of a conventional database system 308. For example, security layer 304 might encrypt and validate objects or other data 303 generated by application program 302 before those data are sent to database management system 308 for storage on untrusted storage medium 310. Although the data would then be stored on the local storage medium 310 in encrypted form 306, such an approach would fail to protect the in meta-data 312 that is associated with encrypted data 306 (e.g. indices, directories, and the like), since these meta-data 312 are typically generated and maintained by the database system 308 itself, and are not readily accessible via outside interfaces. However, the security of the meta-data is important, as an on authorized program might subvert the integrity of the database system by attacking the meta-data. For example, an unauthorized program could effectively delete application data 306 by modifying the indices that refer to those data. Moreover, the approach shown in FIG. 3A might degrade the performance and efficiency of the database system, since encrypted data 306 will typically be difficult for the database management system 308 to organize in a manner that allows for efficient access.

Figure 3B:
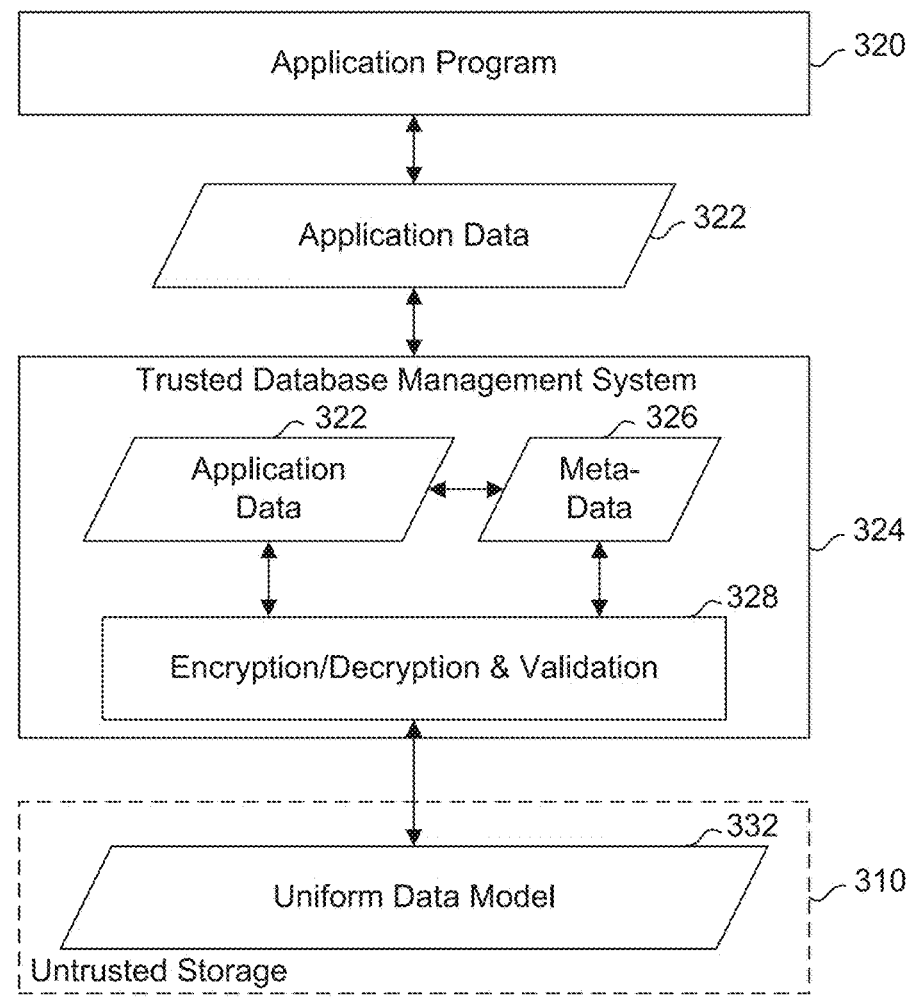
FIG. 3B illustrates the creation of a trusted storage system in accordance with an embodiment of the present invention.

As shown in FIG. 3B, the database system of the present invention provides more comprehensive security and enhanced efficiency by using cryptography over a low-level data model that does not differentiate between application data and meta-data. Data 322 from an application program 320 are written to the trusted database management system 324, which generates appropriate meta-data 326 and then applies security transformations 328 to both application data 322 and meta-data 326 before writing these data to untrusted storage 310. Because the differentiation between application data 322 and meta-data 326 happens in a layer on top of the security layer, this approach provides greater security than the approach shown in FIG. 3A, and also improves performance by enabling the database system to maintain sorted indices on unencrypted data.

Figure 4:
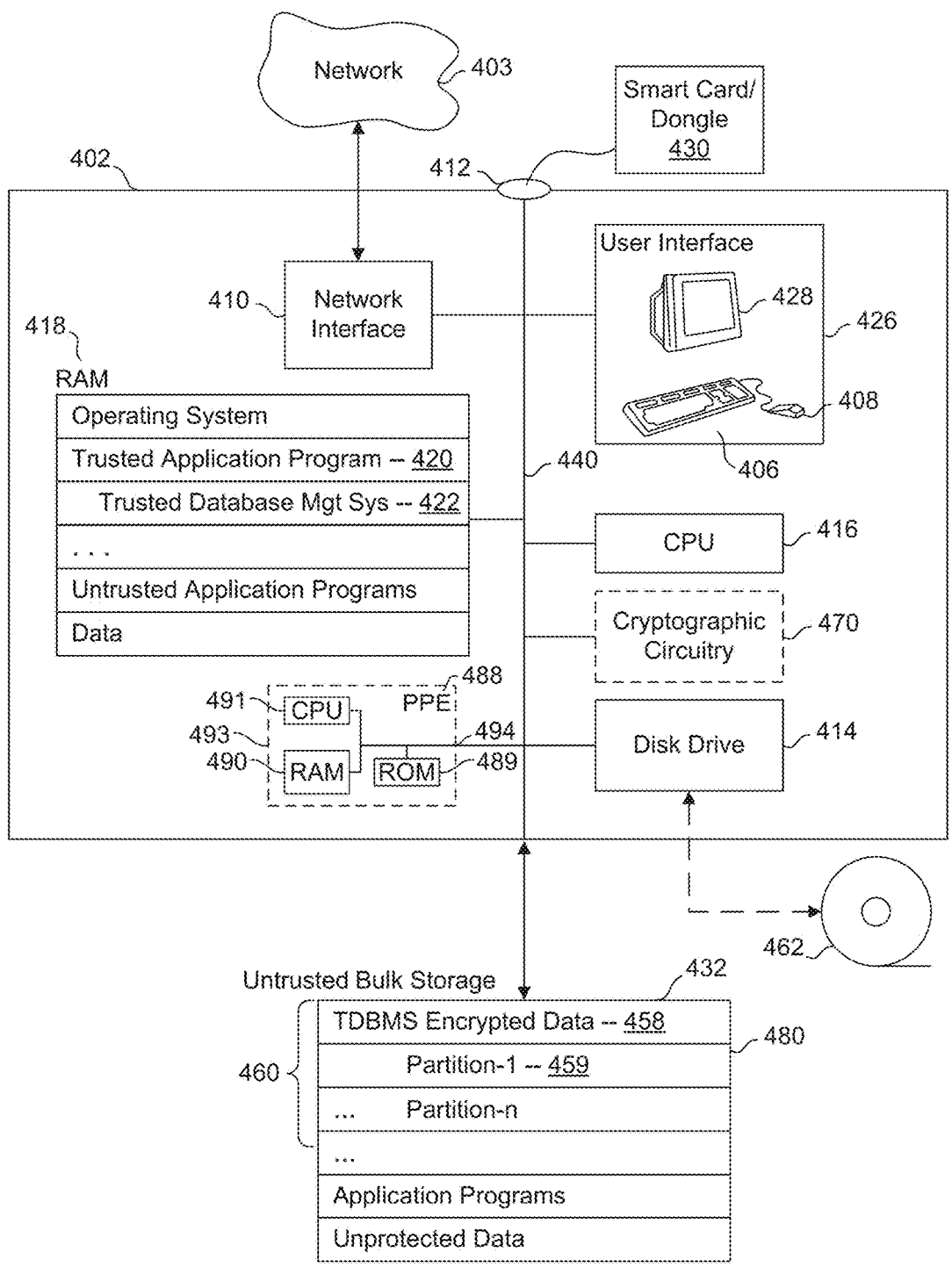
FIG. 4 illustrates a system for practicing an embodiment of the present invention.

FIG. 4 provides a more detailed illustration of a system 402 (such as system 204 in FIG. 2) for practicing embodiments of the present invention. System 402 may consist of a personal computer, a portable audio or video player, a television set-top box, a telephone, a personal digital assistant, or any other suitable device. As shown in FIG. 4, in one embodiment system 402 includes:

a processing unit 416;
system memory 418, preferably including high speed random access memory (RAM) for storing programs and data for use and execution by processing unit 416;
bulk storage 432, comprising erasable or alterable non-volatile memory, such as a magnetic, fixed disk (e.g., a hard disk, diskette, etc.), writeable optical storage, and/or flash memory, for storing application programs, data, and the like;
one or more input/output devices, such as:
network interface 410 for communicating with other systems via a network 403 such as the Internet;
I/O port 412 for connecting to, e.g., a smart card or dongle 430, or other peripheral devices; and/or
one or more disk drives 414 for reading from, and/or writing to, diskettes, compact discs, DVDs, magnetic tape 462, and/or other computer readable media;
a user interface 426, including a display 428 and one or more input devices, such as keyboard 406 and mouse 408; and
one or more internal buses 440 for interconnecting the aforementioned elements of the system.

System 402 may also include special-purpose cryptographic circuitry for, e.g., performing hashing, encryption/decryption, and/or other functions. However, it will be appreciated that these functions may be performed by appropriate software instead.

The operation of system 402 is controlled primarily by programs contained in system memory 418 and executed by the system's processing unit 416. For example, system 402 might contain a trusted application program 420 that generates data for storage in trusted database 460, and that uses data stored in trusted database 460. In addition, system 402 includes a trusted database management system 422 for managing the data stored in trusted database 460, as described in more detail below. The image of trusted database system 422 and/or trusted application 420 can be stored in untrusted bulk storage 432 and loaded into RAM 418, validated, and executed by CPU 416 when the system user wishes to perform operations that require access to the data stored in trusted database 460.

In one embodiment, system 402 may also include a special-purpose projected processing environment 488, such as that which might be provided by an integrated circuit housed in a tamper-resistant hardware package. As shown in FIG. 4, protected processing environment 488 may include non-volatile memory 489, volatile memory 490, a processor 491, a tamper-resistant barrier 493, and a communications port 494 for communicating with other components of system 402. Use of a protected processing environment can be advantageous, in that it provides an area that is protected from unauthorized observation or modification in which to run sensitive programs and to store cryptographic keys and other sensitive information. For example, trusted application 420 and/or trusted database management system 422 can be loaded into RAM 490 of protected processing environment 488 and executed by CPU 491, thus protecting the run-time, volatile state of these programs from being read or modified by unauthorized programs. Additional information about implementations of a protected processing environment can be found in the '900 patent, which was previously incorporated by reference herein.

It should be understood, however, that the present invention can be practiced using systems and methods that do not include or rely on a strongly-protected processing environment such as protected processing environment 488. However, if a strongly-protected processing environment is not used, trusted application program 420 and trusted database management system 422 should make use of software obfuscation and other software self-defensive techniques, since a compromise to the run-time security of these programs can be used to effectively undermine the security provided by database 460. Additional information on suitable software obfuscation and self-defensive techniques can be found in the '900 patent, and in commonly-assigned U.S. patent application Ser. No. 09/095,346, entitled "Obfuscation Techniques for Enhancing Software Security," filed Jun.

9, 1998 ("the '346 application"), and commonly-assigned U.S. Provisional Application No. 60/146,419, entitled "Software Self-Defense Systems and Methods," filed Jul. 29, 1999 ("the '419 application"), each of which is hereby incorporated by reference in its entirety.

Thus, as used herein, a "trusted processing environment" will refer generally to an environment in which the run-time state of trusted application program 420 and trusted database management program 422 are protected in some manner from observation and/or modification by unauthorized programs. The trusted processing environment can be implemented in any suitable fashion, although the less-secure the trusted processing environment, the less secure, or less effective, the trusted database will generally be. For example, as explained above, the trusted processing environment may comprise a special-purpose protected processing environment such as protected processing environment 488, and/or, with less security, may comprise an obfuscated software program running on system RAM 418 and CPU 416, as it will typically be difficult for an attacker to monitor and/or modify such a program during execution.

Figure 5:
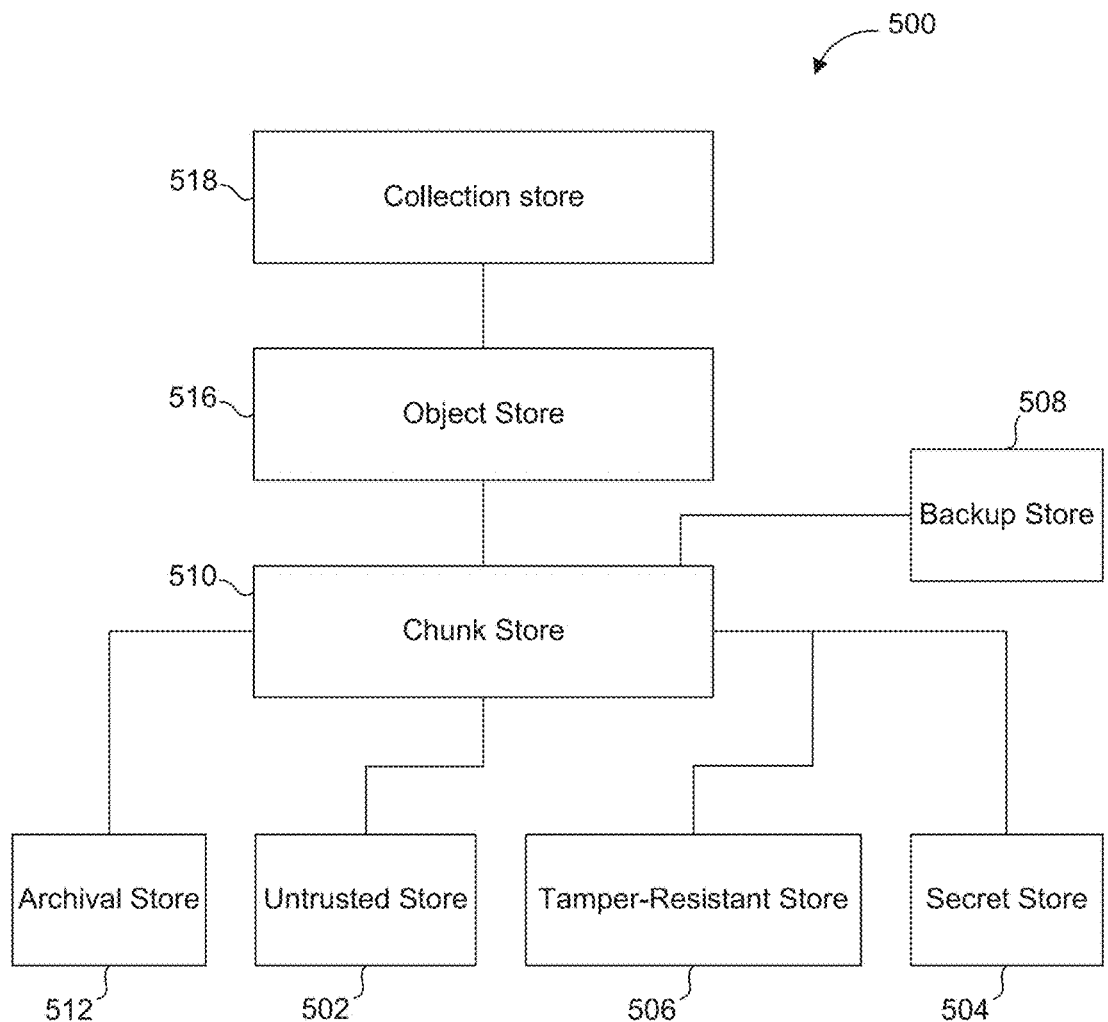
FIG. 5 illustrates the modular architecture of an embodiment of the present invention.

FIG. 5 is a block diagram showing the modular architecture of an embodiment of a trusted database system, where boxes represent modules and arrows represent dependencies therebetween.

As shown in FIG. 5, trusted database 500 can be divided conceptually into a set of modules. Chunk store 510, backup store 508, object store 516, and collection store 518 form a hierarchical interface to the physical media on which date are stored (e.g., the infrastructure modules represented by untrusted store 502, tamper-resistant store 506, secret store 504, and archival store 512). As described in more detail below, chunk store 510, object store 516, and collection store 518 are operable to manage and organize the data stored in a trusted database at different levels of abstraction. Backup store 508 complements the chunk store interface with backup creation and restoration capabilities. In one embodiment collection store 518, object store 516, backup store 508, and chunk store 510 form part of a software database management system (e.g., trusted database management system 422 in FIG. 4) that can be loaded into the memory of a computer system 402 and executed by the system's microprocessor 416 (and/or 490); while archival store 512, untrusted store 502, tamper-resistant store 506, and secret store 504 are comprised of the hardware and/or software components in system 402 and are used to store data.

For ease of explanation, a brief description of each of the infrastructure and program modules shown in FIG. 5 appears below, followed by a more detailed description of the program modules. In the following discussion, use will occasionally be made of a number of terms and concepts that are well-known in the field of database management. Background information on these terms and concepts can be found, for example, in Gray and Reuter, "Transaction Processing: Concepts and Techniques" (Morgan Kaufmann 1993).

Referring to FIG. 5, untrusted store 502 provides the bulk of database 500's persistent storage. Untrusted store 502 may consist of virtually any storage medium with relatively efficient random access, including one or more disks (such as hard disk 432 in FIG. 4), flash memory chips, untrusted storage servers, or a combination thereof. Untrusted store 502 is preferably large enough to hold the contents of the database, including system overhead. Since any program will generally be able to read from or write to untrusted store 502, it may be subject to tampering, and the traffic to and from it will be open to analysis.

Secret store 504 consists of a small amount (e.g., 100 bytes) of read-only, persistent storage that is preferably accessible only by a trusted application program. In one embodiment secret store 504 holds a key that the database program uses to authenticate itself and/or to decrypt private data. Secret store 504 can be implemented in a variety of ways. For example, in systems that have a special-purpose protected processing environment 488, secret store information can be kept in ROM 489. Secret store information can also be embedded directly in trusted application 420 and/or trusted database management system 422 using software obfuscation techniques such as those described in the '900 patent, the '346 application, or the '419 application, each of which was previously incorporated by reference herein. Alternatively, or in addition, secret store information can be stored in modifiable, but obscure, system resources and/or services such as those described in the '900 patent and the '419 application.

Tamper-resistant store 506 provides a small amount (e.g., 100 bytes) of writeable, persistent storage that can preferably be written only by trusted programs. There are a variety of ways to implement tamper-resistant store 506. For example, tamper-resistant store 506 may be provided by a locally-attached device such as a smart card, dongle, or trusted remote server. Like secret store 504, tamper-resistant store 506 may also be provided by obscure system resources such as those described in the '900 patent and the '419 application. (Note that for ease of explanation, the combination of the secret store and the tamper-resistant store will occasionally be referred to as the "trusted store"). In addition, systems that contain a protected processing environment 488 can make use of the non-volatile RAM or flash memory (if any) contained therein. As described in more detail below, in some embodiments the tamper-resistant store can be replaced by another secure mechanism, such as a tamper-resistant counter that only counts up. The database system can sign the counter value and the database hash, thus thwarting replay attacks.

In a preferred embodiment the trusted database system also includes an archival store 512 to facilitate recovery from accidental failures of the untrusted store. The archival store may be untrusted, and need not provide efficient random access to data. In one embodiment archival store comprises magnetic tape or an ftp server.

Chunk store 510 manages application data and meta-data as a set of chunks. Chunks are pieces of data that are stored on untrusted store 502 and read into the trusted processing environment on demand. Each chunk is identified using a unique ID. A chunk is an untyped sequence of bytes, and is the logical unit of encryption, validation, and access to untrusted store 502. In one embodiment, chunks are variable-sized sequences of bytes. In another embodiment, chunks can be fixed-size, much like virtual memory pages. There is typically a performance tradeoff in selecting the amount of data to store in a chunk. Small chunks generally result in less work upon reading and writing, but increase the size of certain meta-data and can cause relatively poor clustering The chunk store is preferably implemented as a log-structured storage system. Log-structured file systems are well-known in the art, and details regarding such systems can be found in Rosenblum and Ousterhout, "The Design and Implementation of a Log-Structured File System," Proceedings of the ACM Symposium on Operating System Principles (1991), which is hereby incorporated by reference in its entirety. As explained in more detail below, log-structured file systems were found to have certain synergies with the provision of database security in preferred embodiments of the present invention. For example, when a chunk is updated, it is physically relocated on untrusted store 502. Chunk store 510 advantageously exploits this relocation for many purposes, including the following: combining the process of locating chunks with the process of validating them, traffic analysis protection, atomic updates in the presence of crashes, snapshots for efficient backups, and so forth. It should be appreciated, however, that file structures besides log-structured file structures could also be used.

As described in more detail below, in a preferred embodiment chunks are logically grouped into partitions with potentially different security parameters. Snapshots of partitions can be taken, and partitions can be compared or "diff'ed," which is useful in making incremental backups. The chunk store supports atomic updates of multiple chunks in the presence of crashes, and hides database logging and recovery from higher modules.

The chunk store provides tamper resistance by maintaining a one-way hash of the database in tamper-resistant store 506. As described in more detail below, when a chunk is read from untrusted store 502, its hash is validated using tire hash stored in tamper-resistant store 506. In another embodiment, the system maintains a counter in tamper-resistant store 506 and signs the hash of the database and the current value of the counter. To update and validate the database hash efficiently, the chunk store can maintain a tree of hash values over the chunks. The hash at the root of this tree represents the hash of the entire database. In one embodiment the tree of hash values is modeled after an approach suggested in Merkle, "Protocols for Public Key Cryptosystems," Proceedings of the IEEE Symposium on Security and Privacy (1980), which is hereby incorporated by reference. The chunk store also encrypts chunks before they are written to untrusted store 502, and decrypts them when they are read. The encryption key is stored in secret store 504.

Backup store 508 creates and restores a set of partition backups. A backup may be full or incremental. The backup store ensures that only consistent snapshots of the database are restored after authorization by the trusted (and possibly remote) database application.

Object store 516 manages a set of named objects. An object is a higher-level abstraction of the data stored by the chunk store 510, and is generally the unit of data that is read or written at the interface between trusted application program 212 and trusted database management system 220 in FIG. 2. For example, in the context of a digital rights management system, objects may include such data abstractions as budgets, account balances, audit records, and the like. Object store 516 may map single or multiple objects into a chunk. Storing a single object in a chunk is simple and efficient for various reasons, and is facilitated by variable-sized chunks. Alternatively, in some embodiments object store 516 may generate relatively-large, fixed-size chunks containing multiple objects. When storing an object in a chunk, the object store flattens the object representation into one that is suitable for persistent storage or transport between platforms. This is called pickling. Pickling also provides a mechanism for compressing the object representation, if desired. Different pickling methods can be used for different types of objects.

The object store keeps a cache of dirty and frequently-used objects. Caching data at this level is beneficial because the data are decrypted, validated, and unpickled. The object store also provides concurrency control for transactional access to objects. The object store caches chunks for good performance, as relocation typically destroys inter-chunk clustering.

Collection store 518 manages a set of named collections of semantically-related objects. The indices on a collection are updated automatically. Collections and indices are themselves represented as objects. Collections may include unordered lists, keyed maps, sorted keyed maps, or other suitable data structures. In one embodiment collections are accessed via iterators. Keyed maps may also be accessed using a key lookup, and sorted keyed maps may be accessed using range queries.

Additional features and illustrative implementation details of the program modules shown in FIG. 5 are set forth below.

Chunk Store

The chunk store manages a set of partitions, each containing a set of chunks. The chunks in different partitions may be encrypted with different encryption algorithms or encryption keys. Note that a partition is a logical group, not necessarily a physical area on the untrusted store. The chunks comprising a partition may be stored virtually anywhere on the untrusted store. The security parameters associated with a partition are used to encrypt, and to hash, its chunks. Chunks and partitions are named with unique identifiers (IDs). A chunk ID comprises the ID of the partition containing it and an element ID that is unique within the partition.

In a preferred embodiment, the chunk store writes chunks by appending them to a log on the untrusted store. In this embodiment chunks do not have static locations outside the log. As described in more detail below, the chunk store uses a chunk map to locate and validate the chunks. When a chunk is written, it is hashed and encrypted, and the map is updated. When a chunk is read, it is decrypted and validated against the map. The chunk map also helps copy partitions using copy-on-write techniques. The chunk map is itself stored as a set of chunks. When a chunk is written or deallocated, its previous version in the log, if any, becomes obsolete. Log cleaning reclaims the storage of obsolete versions.

Tamper-detection is provided by creating a path of hash links from the trusted store to every current chunk version. There is a hash link from one object to another if the first object contains a hash of the second. If an object is linked to another object via one or more links using a collision-resistant hash algorithm, it will be computationally difficult to change the second without changing the state of the first or breaking a hash link. The hash links are embedded in the chunk map and the log.

Similarly, secrecy is provided by creating a path of cipher links from the secret store to each current chunk version. There is a cipher link from a first object to a second object if the second object is encrypted using a key stored in the first.

In one embodiment atomicity for concurrent operations can be provided through mutual exclusion. Although it does not overlap disk accesses and computation, it is simple and acceptable when concurrency is low.

Figure 6:
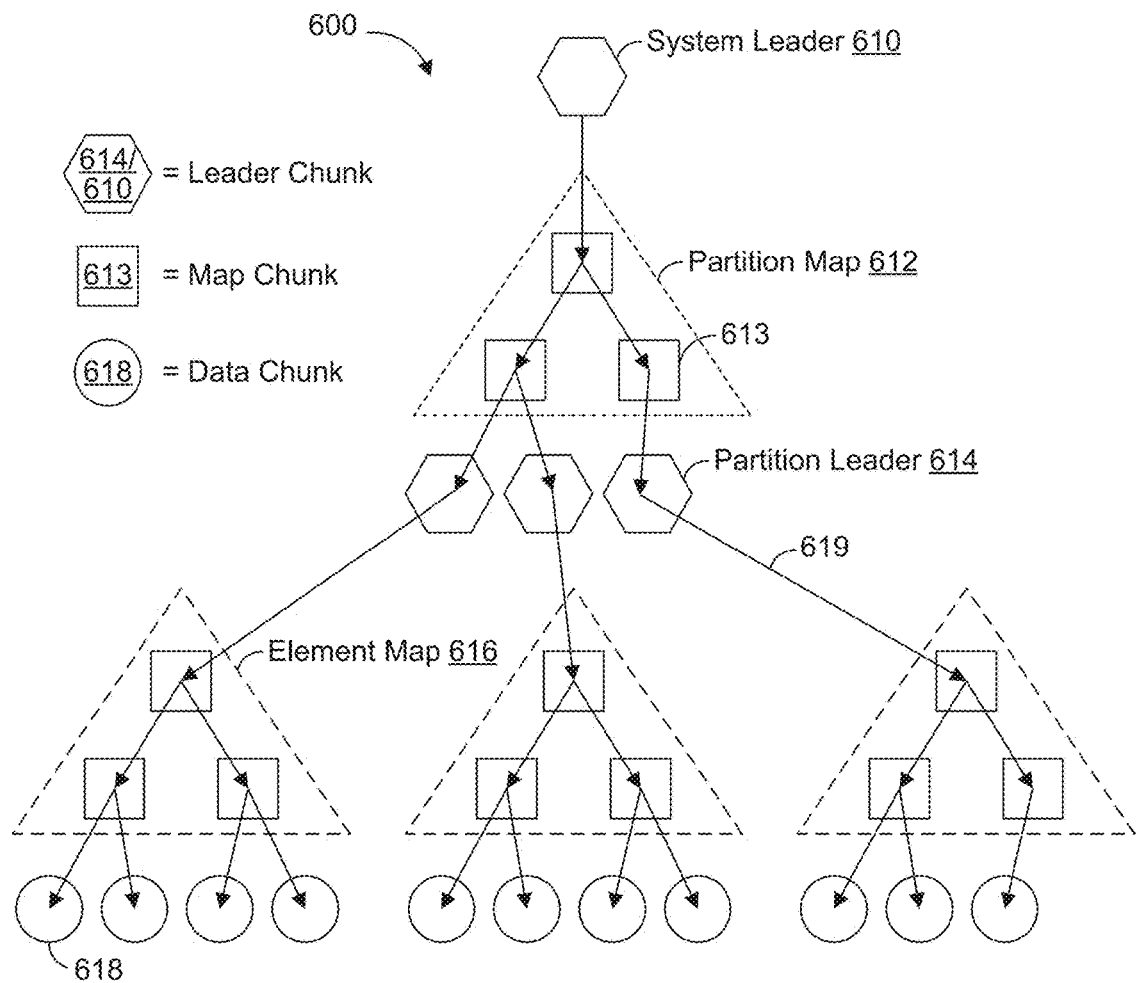
FIG. 6 illustrates a mechanism for organizing data on untrusted storage in accordance with the principles of the present invention.

As previously indicated, in a preferred embodiment application data and indexing information are stored in untrusted storage as a set of chunks with unique IDs. A chunk map maps each chunk ID to its location on the untrusted store and to its expected hash. The chunk map is itself made up of chunks. FIG. 6 illustrates the logical organization of the chunk map in a preferred embodiment. As shown in FIG. 6, the chunk map can be arranged hierarchically in a tree-like structure 600 in order to provide efficient access to a large number of chunks. As described in more detail below, such a tree arrangement facilitates the efficient maintenance of information for validating and locating chunks. The present invention integrates validation and encryption information within the tree data structure to efficiently provide tamper detection and secrecy.

The lowest level of tree 600—i.e., "leaves" 618—consists of data and meta-data generated by the trusted application program, the object store, and/or the collection store. The other levels of the tree consist of chunks containing information used by the chunk store to organize, manage, and secure the leaf data. As shown in FIG. 6, in one embodiment tree 600 has two principle layers: the partition map layer and the element map layer. The element map layer consists of one or more element maps 616—one for each partition—each comprised of a sub-tree of map chunks 613 that terminates in leaf (or data) chunks 618. Although, for ease of explanation, the map chunks shown in FIG. 6 each have one or two children, it will be appreciated that a map chunk can point to any suitable number of children. Similarly, the depth of each sub-tree (612, 616) can be extended as more leaf-level data chunks 618 are added.

FIG. 7A shows an implementation of a map chunk 613 in accordance with an embodiment of the present invention. As shown in FIG. 7A, map chunk 613 includes a table or vector 702 of descriptors 704. Each descriptor corresponds to one of map chunk 613's "children" (i.e., subordinate chunks) in the tree. As shown in FIG. 7A, a chunk descriptor 704 contains data indicating the location 710 of the child on the untrusted store and the child's expected hash value 712. Location data 710 can be used to retrieve the child chunk from the untrusted store, and hash value 712 can be used to verify that the child chunk has not been tampered with. The hash values are generated using a secure one-way hashing algorithm. A characteristic of such algorithms is that, given only a hash value, it is computationally difficult to generate data that hashes to that value. In one embodiment the SHA-1 algorithm is used, although it will be appreciated that other suitable hashing algorithms could be used, such as those described in Schneier, "Applied Cryptography," 2d ed., pp. 429-459 (John Wiley & Sons 1996), which is hereby incorporated by reference.

Referring once again to FIG. 6, the partition map layer of tree 600 sits above the element map layer. Like an element map 616, partition map 612 includes a sub-tree comprised of map chunks. However, unlike an element map 616, the lowest level of map chunks in partition map 612 terminate in "partition leaders" 614, rather than data chunks 618. Generally speaking, partition leaders contain information about the partition, such as the security techniques that are used to protect the partition and the location of the uppermost chunk in the partition's element map.

FIG. 7B illustrates the structure of a partition leader 614 in accordance with an embodiment of the present invention. Referring to FIG. 7B, partition leader 614 preferably includes a descriptor 722 for the uppermost chunk of the element map 616 to which it corresponds. Partition leaders may also contain information regarding the techniques used to encrypt the partition 724. For example, in one embodiment the partition leader includes a special code or index that specifies the type of encryption that was used to encrypt the element map's chunks (sometimes referred to herein as the "cipher"). This information preferably specifies a secret key as well as an encryption algorithm and chaining mode.

In a preferred embodiment, encryption is performed using a well-known encryption technique such as the Data Encryption Standard (DES) in CBC or EBC mode with 8 or 16 byte blocks; however, it will be appreciated that for purposes of practicing the present invention virtually any encryption technique can be used, including without limitation 3DES, Rijndael, Twofish, or the like. Additional encryption techniques are set forth in Schneier, "Applied Cryptography," at 461-482, 233-428, which is hereby incorporated by reference. As shown in FIG. 7B, partition leader 614 also includes the encryption key used to encrypt the chunks in the partition (or a pointer to this key), and may also specify the hashing algorithm 726 used to compute the hashes of the element map chunks (sometimes referred to herein as the "hasher").

Partition leader 614 may also include a variety of other information, such as allocation information 730 and partition copying information 732. Allocation information 730 may, for example, be used in allocating and deallocating chunks. For example, allocation information 730 may include information regarding the number of chunks contained in the partition (e.g., the number of map chunks 613 and data chunks 618), and/or the head of a list of previously-allocated chunks that are now deallocated—also known as the freelist.

Referring once again to FIG. 6, the root of tree 600 is system leader chunk 610. System leader chunk 610 is similar to partition leader chunks 614, and contains a similar set of information. In general, the system leader chunk's relationship to the partition map is analogous to the relationship between the partition leader chunks and the element maps. For example, system leader chunk 610 contains the chunk descriptor of the uppermost map chunk of the partition map. The system leader may also contain information about the technique used to encrypt the partition map, and the key used to perform the encryption (or necessary to perform the decryption).

The relative order of hashing and encrypting chunks is flexible. In one embodiment chunks are hashed before encryption (and, therefore, validated after decryption). This has the security advantage that an attacker does not know the plaintext chunk over which the hash was computed, and therefore cannot launch brute-force attacks to find other chunks that have the same hash value as the first. In another embodiment, chunks are hashed after encryption (and validated before decryption). This has the performance advantage that it is possible to validate a chunk without decrypting it. In general, the system validates a chunk only when it needs to read its content from the untrusted store, so the chunk needs to be decrypted anyway and there is no performance advantage. However, it may be desirable to validate chunks even when there is no need to read them, and it is then that this performance advantage matters. For ease of explanation, the following discussion assumes the use of the first embodiment (i.e., chunks are hashed before encryption); however, it will be appreciated that the second embodiment (i.e., chunks are hashed after encryption) could be readily implemented with straightforward modifications.

When the chunk store is asked to allocate a new chunk, the chunk store returns an element ID for a new data chunk in the appropriate element map. The element ID of a map or data chunk in a partition is based on the position of the chunk in the element map. This approach obviates the need to store element IDs in the map explicitly. Further, it allows the ID of a chunk's parent to be determined, which can be used to optimize reads.

The IDs of deallocated data chunks are reused, in order to keep element maps compact and to conserve ID space. Each element map preferably contains a free-list linked through the freed descriptors; the head is stored in the partition leader.

As mentioned, allocation of IDs is not persistent until the corresponding chunk or partition is written (committed). The descriptors for chunks and partitions that are allocated but not written are marked tentative. Upon recovery from a crash, their IDs are tree-listed for re-allocation.

Figure 8:
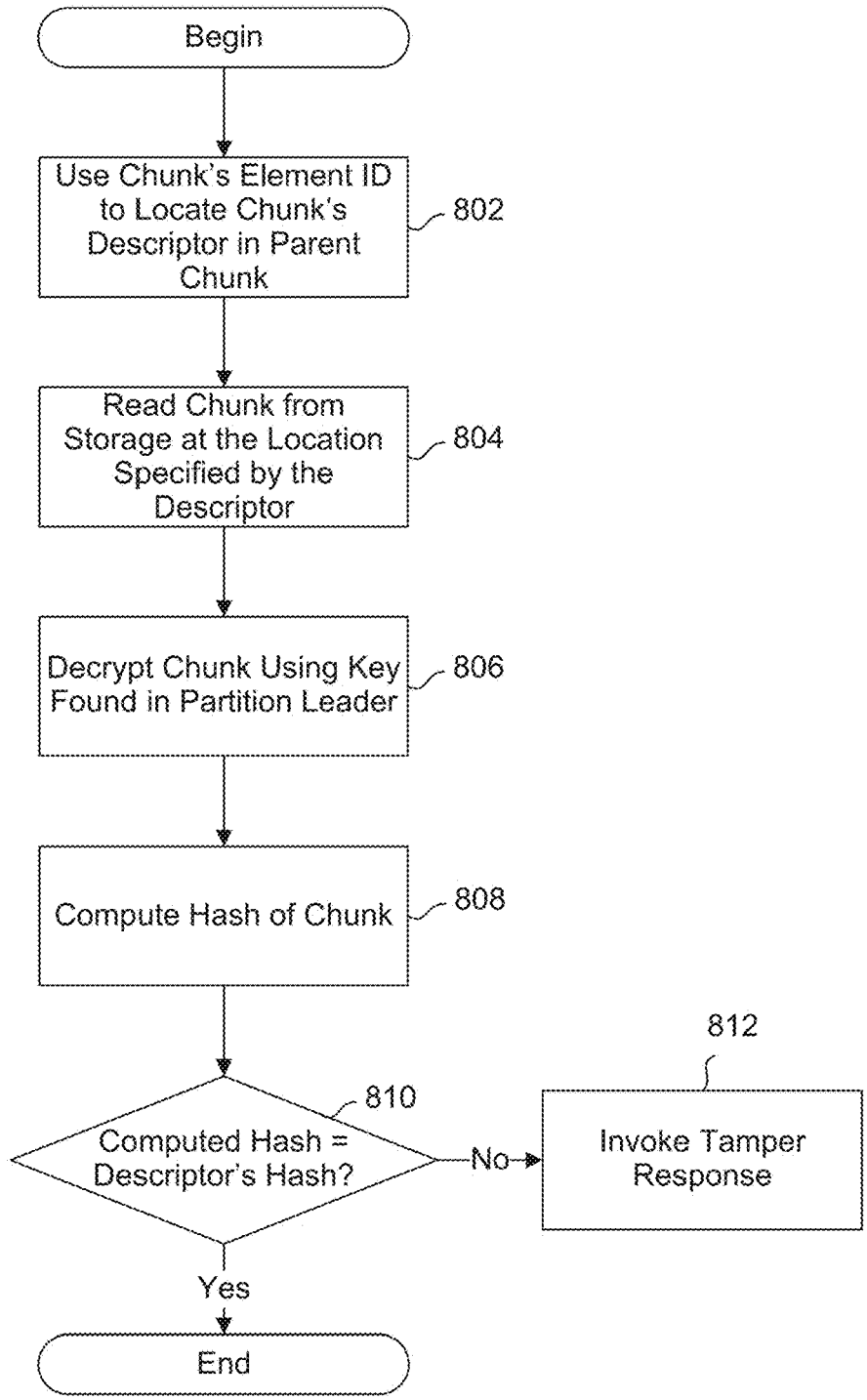
FIG. 8 illustrates the process of reading a chunk from the chunk store.

FIG. 8 illustrates the process of reading a chunk from the chunk store. Referring to FIG. 8, the chunk store first finds the chunk's descriptor in the chunk map (802). The chunk is then read from the chunk store location specified in the chunk's descriptor (804). Next, the chunk is decrypted using the appropriate key for the chunk's partition (806). The chunk store then hashes the chunk using the parameters found in the partition's leader (808), and compares the computed hash with the hash found in the chunk's descriptor (810). If the two hashes are equal, then the chunk is deemed to be valid; otherwise, appropriate defensive measures can be initiated (e.g., denying further access to the database, contacting an external tamper-response team, or any other suitable response) (812).

In a preferred embodiment, the chunk map maintains a cache of descriptors indexed by chunk IDs, and a cache of leader chunks indexed by partition IDs. The cache contains decrypted, validated, and unpickled data. The cache is preferably protected by the trusted processing environment.

If the descriptor for a requested chunk ID c is in the cache, it is returned. Otherwise, the chunk map computes the ID d of the parent chunk of c, and reads d using the regular chunk store operation. Thus the lookup proceeds bottom up recursively, stopping when a descriptor is found in the cache. The lookup for a partition leader progresses similarly in the system partition. Bottom-up traversal exploits the validated cache to avoid validating the entire path from the system leader to the requested chunk.

When committing a set of chunks, the chunk store hashes and encrypts each chunk with its partition's parameters, then writes the set of chunks to the untrusted store at the tail of the log.

When a chunk c is written on the untrusted store, its descriptor is updated to reflect its new location and hash. Tins changes the parent chunk d. If d were also written out, its descriptor and parent would change, and so on up to the system leader. The chunk map uses checkpoints to defer updating and writing the ancestors of chunks written in each commit.

When a chunk is written, its descriptor is merely updated in the chunk-map cache and marked dirty so that it is not evicted. When the cache becomes too large and cannot be shrunk with regular eviction, map chunks containing dirty descriptors and their ancestors up to the system leader are written out as a checkpoint. Checkpointing interacts well with hashing: it defers and consolidates the propagation of hash values up the chunk map from every commit to checkpoints.

A crash loses cached updates to the chunk map, but they are recovered by rolling forward through the chunks written since the last checkpoint. The system leader is written last during a checkpoint, and its location is stored in the trusted store. The part of the log written before the system leader will be referred to as the checkpointed log, and the part including and after the system leader will be referred to as the residual log.

Figure 9A:
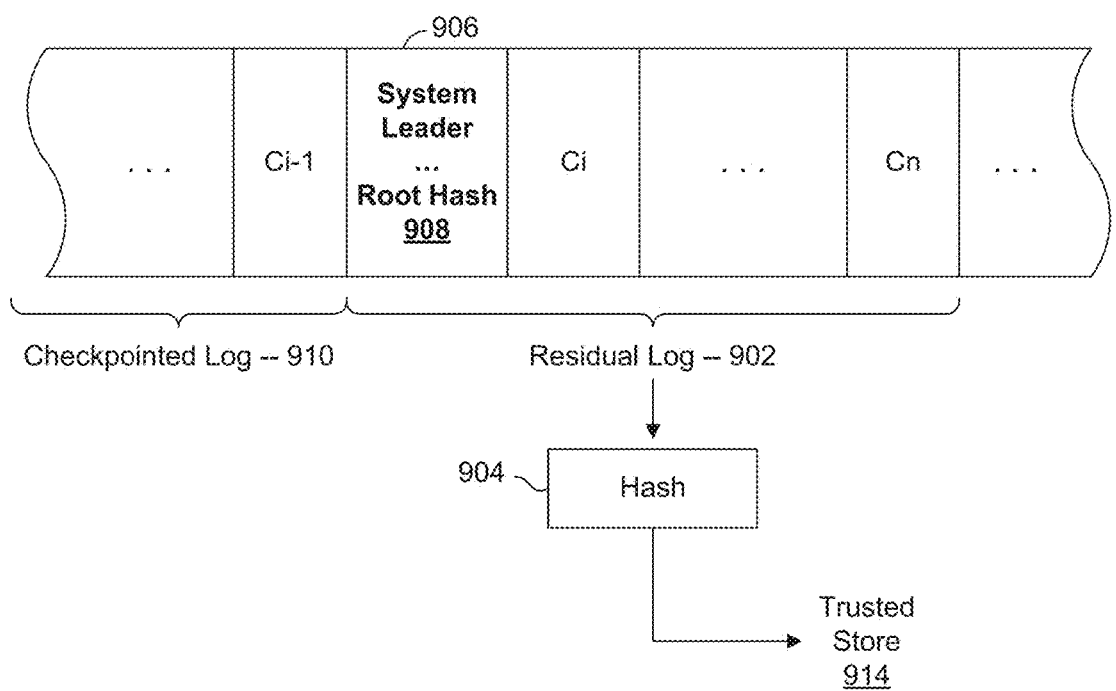
FIGS. 9A and 9B show two possible approaches for maintaining validation information in the tamper-resistant store.
Figure 9B:
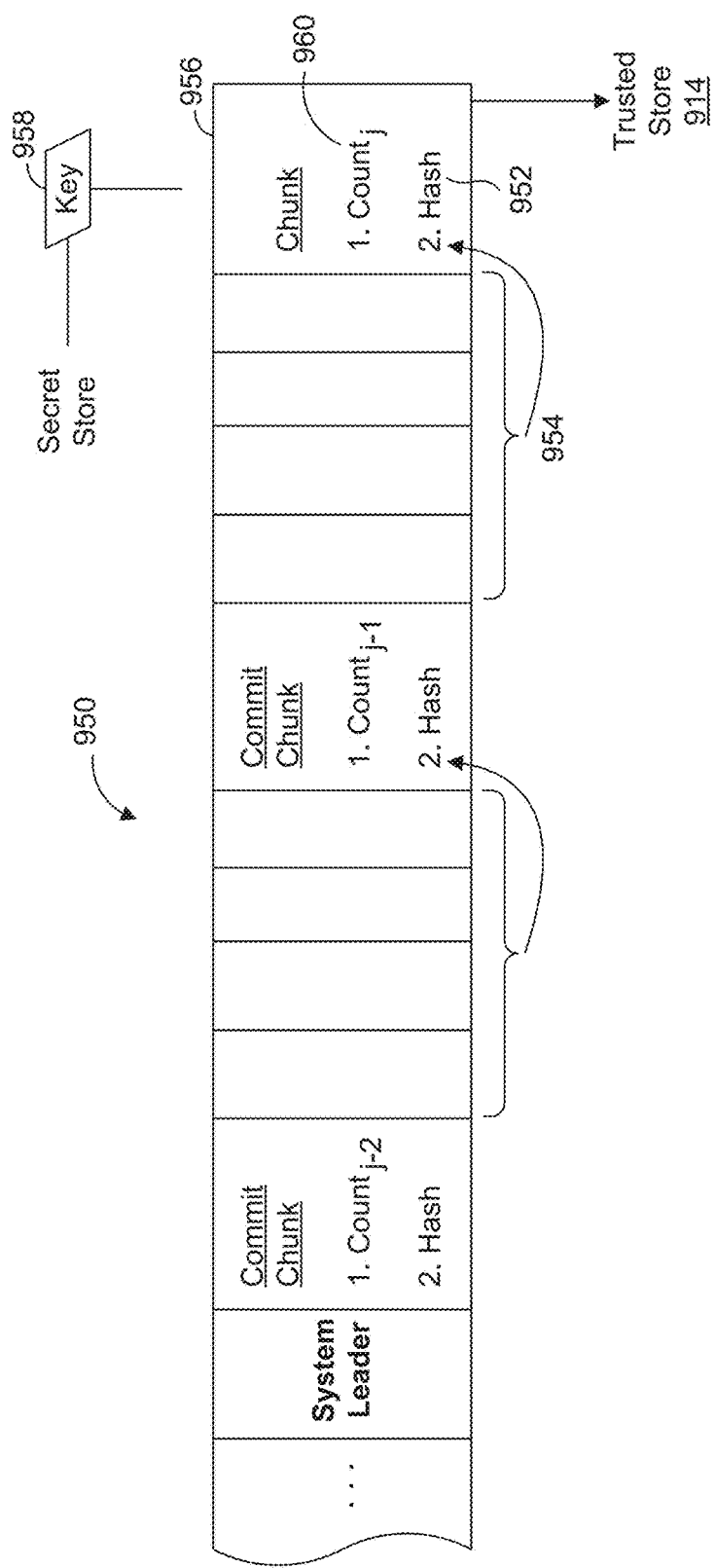

Although checkpointing defers the propagation of hash values up the chunk map, each commit operation still updates the tamper-resistant store to reflect the new state of the database. If the tamper-resistant store contained the hash of the system leader and were updated only at checkpoints, the system would be unable to detect tampering of the residual log. FIGS. 9A and 9B show two possible approaches for maintaining validation information in the tamper-resistant store.

As shown in FIG. 9A, in one embodiment an overall database hash 904 is computed as a sequential hash of all the chunks in the residual log 902. Note that residual log 902 includes the system leader 906 from the last checkpoint, which contains the root 908 of the hash tree for the checkpointed state 910. Thus, hash 904 of residual log 902 covers both the checkpointed state 910 and the chunks written later. Hash 904 is stored in the tamper-resistant store 914 aid is updated after each commit. Upon recovery, the hash in the tamper-resistant store is matched against the hash computed over the residual log.

As shown in FIG. 9B, in a second embodiment, upon each transaction commit, a sequential hash 952 of the committed chunks 954 is stored in an additional chunk 956 that is appended to log 950. Chunk 956, called the commit chunk, is signed by the database system. The signature can be generated by encrypting the commit chunk with a secret key 958. The signature ensures that an attack cannot insert an arbitrary transaction into the residual log, since the attack will be unable to create an appropriately signed commit chunk. Replays of old transactions are thwarted by adding a 64-bit count 960 to commit chunk that is incremented after every commit. Finally, deletion of transactions at the tail of the log is thwarted by storing commit count 960 in the tamper-resistant store 914.

The second exemplary embodiment has several advantages over the first. For example, it can use a weaker tamper-resistant store: a secure counter that can only be incremented. Such a counter might simply comprise an ordinary counter operating in the trusted processing environment, although it will be appreciated that there are a variety of techniques for implementing such a counter. Note that the counter need not be protected against increments by an unauthorized program, since an unauthorized increment would simply create a mismatch and invoke a tamper response, and thus there is little incentive for an attacker to increment the counter. Note, however, that tamper-detection still relies on the secrecy of the key used to sign the commit chunk, and thus, even if a database system needed only to provide tamper-detection, but not secrecy, it would still need a secret store.

Another advantage is that the use of a commit count allows the system to tolerate bounded discrepancies between the expected database state and the stored database state, if desired. For example, the system might allow the count in the tamper-resistant store $c_i$ to be a little behind the count in the last commit chunk $c_j$. This trades off security for performance. The security risk is that an attacker might delete transactions $c_{i+1}$ through $c_j$. The performance gain is that the commit operation need not wait for updating the count in the tamper-resistant store—as long as the latter is not far behind. Thus, updates to the tamper-resistant store can be done lazily in most cases, which is particularly beneficial if the tamper-resistant store has a high latency (e.g., a smartcard). The system might even allow the count in the tamper-resistant store $c_i$ to leap ahead of the count in the last commit chunk $c_j$. This admits situations where the untrusted store is written lazily (e.g., IDE disk controllers often flush their cache lazily) and there is a chance that the tamper-resistant store might be updated before the untrusted store. Again, the security risk is a deletion of transactions $c_{j+1}$ through $c_i$. For ease of explanation, the following discussion assumes the use of the second exemplary embodiment; however, it will be appreciated that the first exemplary embodiment, or other suitable approaches, could be used instead.

The location of the head of the residual log is stored at a fixed place for use at recovery, as in other log-structured storage systems. It need not be kept in tamper-resistant store, provided that upon recovery the system checks that the stored head of the log actually points to a system leader.

Since the location of the head of the residual log is updated infrequently—at each checkpoint—it may be stored in a separate location on untrusted store without degrading performance.

To recover from crashes, upon startup, the chunk store retrieves the head of the residual log from the fixed location where it was stored. It reads the chunk versions in the residual log, guided by next-segment chunks, until it reaches the end of the log. For each chunk version, it redoes the chunk map appropriately. For each set of chunks committed in a transaction, it computes a sequential hash and compares the hash with that stored in the corresponding commit chunk. It also checks that the counts stored in the commit chunks form a proper sequence. Finally, it raises an alarm if the count in the last commit chunk differs by more than a specified tolerance from the count found in the tamper-resistant store.

To copy a partition P to Q, the chunk store copies the state in P's leader to Q's leader. It also duplicates the cached ditty descriptors for chunks in P to the corresponding chunks in Q. Note that Q and P share both map and data chunks, and Q inherits all security parameters from P. Thus, partition copies are cheap in space and time.

When chunks in P are updated, the element map for P is updated, but that for Q continues to point to the chunk versions at the time of copying. The chunks of Q can also be modified independently of P. However, the common use is to create a read-only copy, or a snapshot, which can be used to read a consistent state of the source partition without blocking updates on the current state of the partition.

The chunk store diffs two partitions by traversing their element maps and comparing the descriptors of the corresponding chunks. Diffs are commonly performed between two snapshots of the same partition.

The structure of the log will now be described in more detail. The log consists of a sequence of chunks, and for purposes of discussion, the representation of a chunk in the log will be referred to as a version.

In one embodiment, chunk versions are read for at least three different functions:

Read operations, which know the chunk ID and the descriptor for the current version.

Log cleaning, which reads a segment of the checkpointed log sequentially.

Crash recovery, which reads the residual log sequentially.

Figure 10:
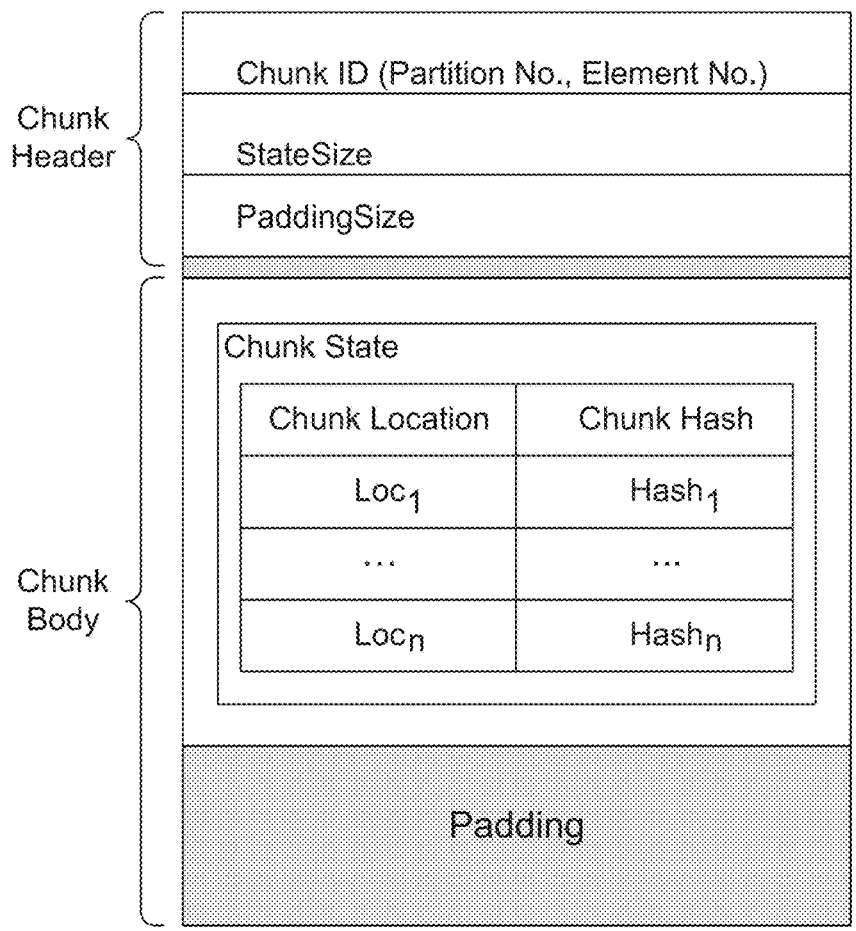
FIG. 10 illustrates the format of a chunk version in accordance with an embodiment of the present invention.

To enable sequential reading, the log contains information to identify and demarcate chunks. Each chunk version comprises a header and a body. The header contains the chunk ID, the size of the chunk state, and the size of padding. The body contains the chunk state plus some padding to make it an integral multiple of the cipher block size. Note that if all chunks were encrypted using the same block size, the padding size could be computed from the size of the chunk state. In one embodiment, block sizes may vary from 1 to 256 bytes. Note also that it may not always be possible to compute the padding size from the cipher for the chunk's partition, since the chunk version might be obsolete and its partition might have been deallocated. An example of a chunk version is shown in FIG. 10.

The header is encrypted with the system cipher $E_s$ so cleaning and recovery are able to decrypt the header without knowing the partition ID. The body is encrypted with the cipher of the chunk's partition $E_p$. The representation is illustrated below for clarity.

Log :: a ChunkVersion*
ChunkVersion ::=$E_s$ (ChunkHdr) $E_p$ (ChunkBody)
ChunkHdr ::=ChunkID StateSize PaddingSize
ChunkBody ::=ChunkState Padding The untrusted store is divided into fixed-size segments to aid cleaning, as in the Sprite log-structured file system described in Rosenblum and Ousterhout, "The Design and Implementation of a Log-Structured File System," Proceedings of the ACM Symposium on Operating System Principles (1991), previously incorporated herein by reference. The segment size is chosen for efficient reading and writing by the cleaner, e.g., on the order of 100 Kbytes for a disk-based untrusted store. A segment is expected to contain many chunk versions. The size of a chunk version is limited by the segment size. The set of chunks written in a commit operation may span multiple segments.

The log is represented as a sequence of potentially non-adjacent segments. Since crash recovery needs to read the residual log sequentially, segments in the residual log contain a next-segment chunk at the end, which contains the location of the next segment. Next-segment chunks are instances of unnamed chunks.

Unnamed chunk versions do not have chunk IDs. They are useful in the residual log for recovery, but are obsolete in the checkpointed state. For example, a deallocation chunk is written to indicate the deallocation of a chunk or partition ID. It is used during recovery to redo the chunk map, but is obsolete in the checkpointed state. The commit chunk described above is another example of an unnamed chunk. The use of unnamed chunks avoids the complexity of allocation and deallocation of regular chunk positions to store the same information.

An unnamed chunk version has a header with an invalid chunk ID. Its body is secured with the system cipher and hasher. The hash stored in a commit chunk also covers any unnamed chunks written by the transaction (with the exception of the commit chunk itself). The hash of an unnamed chunk in the checkpointed log is not stored, since unnamed chunks do not have a place in the element map.

A log cleaner reclaims the storage of obsolete chunk versions, and compacts the storage to create empty segments for writing. It picks a segment to clean and determines whether each chunk version is current by using the chunk ID in the header to find the current location in the chunk map. It then commits the set of current chunks, which writes them to the end of the log. All of this happens atomically with respect to externally invoked operations. Cleaning may be invoked synchronously when space is low, but most of it happens asynchronously if sufficient idle periods are present.

If the cleaner is unable to generate a sufficient number of free segments through cleaning, it may also allocate additional space on the untrusted store. The cleaner dynamically manages the size of the database by increasing and shrinking its size. Based on the desired characteristics of the database, it trades off performance and space utilization.

Under certain circumstances, such as checkpointing, the cleaner may be disabled (prevented from cleaning) because cleaning would interfere with such operations. When the cleaner is disabled and the free segments at the end of the log are exhausted, the cleaner is forced to increase the size of the database to generate additional space.

The cleaner need not validate the chunks read from the segment, provided that their hashes are preserved in the chunk map when they are committed. If the hashes are recomputed as part of a regular commit, the cleaner validates the chunks first; otherwise, the cleaner might launder chunks modified by an attack.

Tampering can cause a current chunk version for a chunk ID c to appear as a dead chunk version for some other chunk ID d. This is not a threat, however, because it does not change the chunk descriptor for either c or d, and tampering will be detected when c is read.

Partition copies complicate checking whether a version is current. A version contains the ID of the partition P to which it belonged when it was written. Even if the version is obsolete in P, it may be current in some direct or indirect copy of P. Therefore, the IDs of the direct copies of each partition are stored in the partition's leader, and the cleaner recursively checks the copies to see if they are current. The process would be more complex if deallocation of a partition did not deallocate its copies.

In one embodiment the cleaner does not clean segments in the residual log, since that would reclaim unnamed chunks and destroy the sequencing of segments. If the residual log becomes too large relative to the size of the database, the cleaner can request that a checkpoint occur to free more segments for cleaning. In one implementation, the cleaner picks checkpointed segments to clean based on statistical information. These statistics, such as segment utilization are stored in a segment usage table as in the Sprite log-structured file system. The segment usage table is stored persistently like the chunk map.

Operations on partitions and chunks are designed to support transactional updates and incremental backups. For purposes of illustration, a summary of some exemplary chunk store operations are provided below in simplified form:

Partition Operations:
allocateID ( ) returns partitionID
Returns an unused partitionID.
write (partitionID, cipher, hasher)
Sets the state of partitionID to an empty partition with the specified security parameters.
write (partitionID, sourcePID)
Copies the current state of sourcePID to partitionID. Each chunk in sourcePID is logically duplicated in partitionID with the same element ID.
diff (oldPID, newPID) returns set<elementID>
Returns the set of element IDs whose state is different in newPID and oldPID.
deallocate (partitionID)
Deallocates partitionID and all of its copies, and all chunks in these partitions.
Chunk Operations:
allocateId (partitionID) returns elementID
Returns an unused element ID in partitionID.
write (chunkID, bytes)
Sets the state of chunkID to bytes, possibly of a different size than its previous state.
read (chunkID) returns bytes
Returns the current state of chunkID.
deallocate (chunkID)
In a preferred embodiment, any chunk store operation may invoke a tamper-response mechanism if it reads some data from the untrusted store that fails validation. For purposes of practicing the present invention any suitable tamper response mechanism could be used, including those described in the '900 patent and the '419 application, which were previously incorporated by reference.

The chunk store is preferably unaware of transactions. Allocate, read, and commit operations from different transactions may be interleaved; however, each operation is executed atomically with respect to the others.

Note that the write and deallocate operations listed above are actually special cases of the commit operation. In general, a number of write and deallocate operations on chunks and partitions may be grouped into a single commit operation, which is atomic with respect to crashes. Allocated but unwritten chunk and partition IDs are deallocated automatically upon a system restart. In one embodiment the allocate and commit operations are separated. An alternative would be to allocate IDs when new, unnamed chunks or partitions are committed; however, this alternative would not allow an application to store a newly allocated ID in another chunk during the same commit, which may be needed for data integrity.

Backup Store

Use backup store creates and restores backup sets. A backup set consists of one or more partition backups. The backup store creates backup sets by streaming backups of individual partitions to the archival store and restores them by replacing partitions with the backups read from the archival store.

The backup store provides consistency of backup creation and restoration with respect to other chunk store operations. Instead of locking each partition for the entire duration of backup creation, the backup store creates a consistent snapshot of the source partitions using a single commit operation. It then copies the snapshots to archival storage in the background. If restores are relatively infrequent, it may be acceptable to stop all other activity while a restore is in progress.

Figure 11:
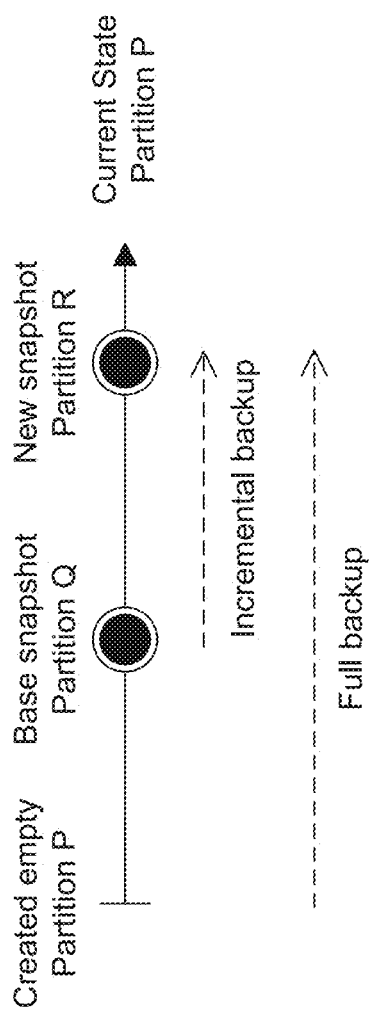
FIG. 11 illustrates different types of partition backups.

As shown in FIG. 11, partition backups may be full or incremental. A full partition backup contains all data chunks of the partition. An incremental backup of a partition is created with respect to a previous snapshot, the base, and contains the data chunks that were created, updated, or deallocated since the base snapshot. Backups do not contain map chunks since chunk locations on the untrusted store are not needed. Chunks in a backup are represented like chunk versions in the log.

A partition backup contains a backup descriptor, a sequence of chunk versions, and a backup signature. In one embodiment the backup descriptor contains the following:
ID of source partition (P)
ID of partition snapshot used for this backup (R)
ID of base partition snapshot (Q, if incremental)
backup set ID (a random number assigned to the set)
number of partition backups in the backup set
partition cipher and hasher
time of backup creation The representation of partition backups is illustrated below. Here, $H_s$ denotes the system hasher, $H_p$ denotes the partition hasher, $E_s$ denotes system cipher, and $E_p$ denotes the partition cipher.

PartitionBackup ::=
  $E_s$ (BackupDescriptor)
  $E_s$ (ChunkHeader) $E_p$ (ChunkBody))*
  BackupSignature Checksum
BackupSignature ::=
   $E_s$ ($H_s$ (BackupDescriptor $H_p$ ((ChunkID ChunkBody) *)))

The backup signature binds the backup descriptor with the chunks in the backup and guarantees integrity of the partition backup. The unencrypted checksum allows an external application to verify that the backup was written completely and successfully.

The backup store restores a backup by reading a stream of partition backups from the archival store. In one embodiment the backup store restores one partition at a time, enforcing the following constraints:

An incremental partition backup cannot be restored before its base is restored.

If a partition backup is restored, the remaining partition backups in the same backup set must also be restored.

If the above constraints are satisfied after reading the entire backup stream, the restored partitions are atomically committed to the chunk store.

The first constraint guarantees that incremental backups are restored in the same order as they were created, with no missing links inbetween. It is enforced by matching the base partition ID in the backup descriptor against the ID of the previous restored snapshot for the same partition.

The second constraint guarantees that sets of partitions are restored consistently. It is enforced by matching the number of backups with a given set ID against the set size recorded in backup descriptors.

Backup restores preferably require approval from the database application, which may deny frequent restorations or restorations of old backups.

The systems and methods of the present invention are focused primarily on integrating security with storage management in the chunk store. For purposes of explanation, an illustrative implementation of the other layers shown in FIG. 5 will also be described in order to show that the chunk store is able to support them.

Object Store

An object is the unit of typed data accessed by the database application. The object store enhances the security of the trusted database system by protecting the database from application software faults. This is achieved by providing type-safe object storage and transactional semantics. The object store supports creation, deletion, reading, and writing of objects based on object IDs. The object store allows a sequence of object operations to be executed as a transaction.

The object store isolates concurrent transactions by using two-phase looking on objects, and by breaking deadlocks using a timeout mechanism. Transactions acquire locks in either shared or exclusive mode. If a typical workload includes only a few concurrent transactions, it may be unnecessary to implement granular or operation-level locks.

In one embodiment, the object store maintains a cache of unpickled objects. The object store cache is managed using a no-steal policy and a least-recently-used cache replacement scheme. Since the trusted platform may not provide perfect protection of the trusted database's runtime environment, caching objects that contain sensitive data (such as encryption keys) may create security vulnerability. Therefore, in a preferred embodiment the object store encrypts the tail of the replacement chain or evicts certain objects even before reaching the end of the chain. (Note, too that no-steal buffering of dirty data may not scale well to transactions with many modifications, and thus can be replaced if this becomes an issue.)

The object store can store one or more pickled objects in each chunk. In one embodiment each object is stored in a different chunk, as this approach reduces the volume of data that must be encrypted, hashed, and written to the untrusted store during a transaction commit. In addition, this approach simplifies the implementation of transaction commit and abort, since no chunk can contain both committed and uncommitted objects. At the same time, storing each object in a different chunk destroys inter-object clustering and increases the size of the chunk map. In embodiments where the trusted database system is used to manage relatively small databases, which can be almost entirely cached, the lack of inter-object clustering will typically be unimportant, and storing each object in a separate chunk will generally be preferable. However, it will be appreciated that either approach could be used without departing from the principles of the present invention.

Collection Store

Trusted applications can take full advantage of the system architecture shown in FIG. 3B by using a collection store that enables efficient searching of collections of decrypted objects. The collection store organizes and manages semantically-related objects (or "collections"). Collections are sets of objects sharing one or more indices. Indices can be dynamically added and removed from each collection. Collections and indices are themselves represented as objects.

The collection store supports functional indices that use keys extracted from objects by deterministic functions. The use of functional indices obviates the need for a separate data definition language for the database schema. Indices can be organized as lists, hash tables, B-trees, or the like. Applications can access objects in a collection using iterators. Depending on the index organization, the iterators can implement scan, exact-match, and range queries. Indices are maintained automatically as objects are updated. Indices can also enforce uniqueness of the indexed keys.

Thus, a trusted database system has been described, as well as a variety of techniques for implementing and using it. Embodiments of the present invention facilitate the storage of sensitive data in digital rights management and other systems.

The trusted database system leverages a trussed processing environment and a small amount of trusted storage to provide tamper-detection and secrecy to a bulk of untrusted storage. The trusted database integrates encryption and hashing with a low-level data model which secures data and meta-data uniformly. This model is powerful enough to support higher-level database functions such as transactions, backups, and indexing.

A preferred embodiment uses log-structured storage, which is well-suited for building such a system. The implementation is simplified by embedding a hash tree in the comprehensive location map that forms an important part of log-structured systems, thus enabling objects to be validated as they are located. A checkpointing optimization defers and consolidates the propagation of hash values up the tree. Since updates are not made in place, a snapshot of the database state can be created using copy-on-write, which facilitates incremental backups. The absence of fixed object locations may reduce the predictability of accesses, providing resistance to traffic monitoring.

As described above, certain embodiments of the present invention offer some or all of the following:

Trusted bulk storage: The trusted database provides tamper-detection and secrecy for bulk data. This includes resistance to replay attacks and attacks on meta-data.

Partitions: The trusted database allows trusted application programs to secure different types of data with different parameters. For example, the application program may have no need to encrypt some data or to validate other data. The trusted database provides logical partitions, each securing data with its own encryption and hashing parameters. Securing data with appropriate parameters helps avoid unnecessary time and space overhead. The use of different keys reduces the loss from the disclosure of a single key.

Atomic updates: The trusted database provides updates that are atomic with respect to fail-stop crashes.

Backups: The trusted database can back up a consistent snapshot of a set of partitions, and restore a validated backup under application control. Backups allow recovery front database corruption due to media failures. The trusted database provides last incremental backups, which contain changes made since a previous backup.

Concurrent transactions: The trusted database provides serializable access to data from concurrent transactions. In one embodiment the trusted database system is geared toward low concurrency (as appropriate for a client-side digital rights management application that is not expected to be accessed by many concurrent users); however, it will be appreciated that higher levels of concurrency could be readily supported with straightforward modifications.

Workload: In one embodiment, the trusted database is expected to support a single user, which leads to a bursty workload with long idle periods. Thus, although the trusted database employs techniques for reducing latency, one skilled in the art will appreciated that for other applications, more sophisticated technique for sustaining a high throughput may be desirable, and can be readily implemented without departing from the principles of the present invention.

Database size: In one embodiment, the trusted database is expected to manage databases of moderate sizes (1 Mbyte to 1 Gbyte). Thus, much of the working set will be cached, so physical clustering is not crucial. Nonetheless, the trusted database allows the database to scale with gradual performance degradation. It stores meta-data using scalable data structures and fetches the data piecemeal on demand.

Objects: The trusted database provides abstract objects that the application can access without explicitly invoking encryption, validation, and pickling.

Pickling: The trusted database provides hooks for pickling objects so a database is independent of compiler and machine architecture changes. Pickling may also save space by compressing object representation.

Collection and Indices: The trusted database provides index maintenance over collections of objects. A collection is a set of objects that share one or more indices. An index provides scan, exact-match, and range iterators.

Modular architecture: The trusted database is designed for use on personal computers as well as smaller devices, although it will be appreciated that the principals described herein could be readily applied to other platforms as well. The architecture of the trusted database is layered, so applications can trade off functionality for smaller code size and complexity.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method for storing data in an untrusted data store, the method being performed by a system comprising a processor and a non-transitory computer-readable storage medium storing instructions that, when executed by the processor, cause the system to perform the method, the method comprising:
   receiving a first block of data for storage on a first partition of the untrusted data store;
   retrieving a first partition leader associated with the first partition, the first partition leader specifying first security parameters associated with the first partition;
   generating a first hash value of the first block of data;
   encrypting the first block of data;
   storing the encrypted first block of data in the first partition of the untrusted data store; and
   generating a first descriptor associated with the encrypted first block of data, the first descriptor comprising a location of the encrypted first block of data on the untrusted data store and the first hash value.

2. The method of claim 1, wherein the first security parameters specify a first encryption type associated with the first partition.

3. The method of claim 2, wherein the specified first encryption type comprises an indication of a first encryption algorithm associated with the first partition.

4. The method of claim 1, wherein the first security parameters comprise a first encryption key associated with the first partition, and wherein encrypting the first block of data comprises encrypting the first block of data using the first encryption key.

5. The method of claim 1, wherein the first security parameters comprise first hashing parameters associated with the first partition, and wherein generating the first hash value comprises computing the first hash value using the first hashing parameters.

6. The method of claim 1, wherein the method further comprises
   receiving a second block of data for storage on a second partition of the untrusted data store;
   retrieving a second partition leader associated with the second partition, the second partition leader specifying second security parameters associated with the second partition, the second security parameters being different, at least in part, from the first security parameters associated with the first partition;
   generating a second hash value of the second block of data;
   encrypting the second block of data;
   storing the encrypted second block of data in the second partition of the untrusted data store; and
   generating a second descriptor associated with the encrypted second block of data, the second descriptor comprising a location of the encrypted second block of data on the untrusted data store and the second hash value.

7. The method of claim 6, wherein the second security parameters specify a second encryption type associated with the second partition.

8. The method of claim 7, wherein the specified second encryption type comprises an indication of a second encryption algorithm associated with the second partition.

9. The method of claim 6, wherein the second security parameters comprise a second encryption key associated with the second partition, and wherein encrypting the second block of data comprises encrypting the second block of data using the second encryption key.

10. The method of claim 6, wherein the second security parameters comprise second hashing parameters associated with the second partition, and wherein generating the second hash value comprises computing the second hash value using the second hashing parameters.

11. A non-transitory computer-readable storage medium storing executable instructions that, when executed by a processor, cause the processor to perform a method for storing data in an untrusted data store comprising:
receiving a first block of data for storage on a first partition of the untrusted data store;
retrieving a first partition leader associated with the first partition, the first partition leader specifying first security parameters associated with the first partition;
generating a first hash value of the first block of data;
encrypting the first block of data;
storing the encrypted first block of data in the first partition of the untrusted data store; and
generating a first descriptor associated with the encrypted first block of data, the first descriptor comprising a location of the encrypted first block of data on the untrusted data store and the first hash value.

12. The non-transitory computer-readable storage medium of claim 11, wherein the first security parameters specify a first encryption type associated with the first partition.

13. The non-transitory computer-readable storage medium of claim 12, wherein the specified first encryption type comprises an indication of a first encryption algorithm associated with the first partition.

14. The non-transitory computer-readable storage medium of claim 11, wherein the first security parameters comprise a first encryption key associated with the first partition, and wherein encrypting the first block of data comprises encrypting the first block of data using the first encryption key.

15. The non-transitory computer-readable storage medium of claim 11, wherein the first security parameters comprise first hashing parameters associated with the first partition, and wherein generating the first hash value comprises computing the first hash value using the first hashing parameters.

16. The non-transitory computer-readable storage medium of claim 11, wherein the method further comprises
receiving a second block of data for storage on a second partition of the untrusted data store;
retrieving a second partition leader associated with the second partition, the second partition leader specifying second security parameters associated with the second partition, the second security parameters being different, at least in part, from the first security parameters associated with the first partition;
generating a second hash value of the second block of data;
encrypting the second block of data;
storing the encrypted second block of data in the second partition of the untrusted data store; and
generating a second descriptor associated with the encrypted second block of data, the second descriptor comprising a location of the encrypted second block of data on the untrusted data store and the second hash value.

17. The non-transitory computer-readable storage medium of claim 16, wherein the second security parameters specify a second encryption type associated with the second partition.

18. The non-transitory computer-readable storage medium of claim 17, wherein the specified second encryption type comprises an indication of a second encryption algorithm associated with the second partition.

19. The non-transitory computer-readable storage medium of claim 16, wherein the second security parameters comprise a second encryption key associated with the second partition, and wherein encrypting the second block of data comprises encrypting the second block of data using the second encryption key.

20. The non-transitory computer-readable storage medium of claim 16, wherein the second security parameters comprise second hashing parameters associated with the second partition and wherein generating the second hash value comprises computing the second hash value using the second hashing parameters.

* * * * *